US012757923B2

United States Patent
(12) United States Patent
Scremin et al.

(10) Patent No.: US 12,757,923 B2
(45) Date of Patent: Oct. 13, 2026

(54) APPARATUS AND METHOD FOR PROCESSING PLANT MATERIAL

(71) Applicant: BRITISH AMERICAN TOBACCO (INVESTMENTS) LIMITED, London (GB)

(72) Inventors: Jeronimo Scremin, Rio de Janeiro (BR); Eleandro Crestani, Rio de Janeiro (BR); Renato Martini, Rio de Janeiro (BR)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 786 days.

(21) Appl. No.: 17/999,018

(22) PCT Filed: May 25, 2021

(86) PCT No.: PCT/EP2021/063922
§ 371 (c)(1),
(2) Date: Nov. 16, 2022

(87) PCT Pub. No.: WO2021/239738
PCT Pub. Date: Dec. 2, 2021

(65) Prior Publication Data
US 2023/0232887 A1 Jul. 27, 2023

(30) Foreign Application Priority Data
May 25, 2020 (BR) ......................... 102020010446-2

(51) Int. Cl.
*A24B 5/02* (2006.01)
*A24B 3/16* (2006.01)
(Continued)

(52) U.S. Cl.
CPC .................. *A24B 5/02* (2013.01); *A24B 3/16* (2013.01); *A24B 5/04* (2013.01); *A24B 5/12* (2013.01); *B65G 17/32* (2013.01); *B65G 43/08* (2013.01)

(58) Field of Classification Search
CPC .... A24B 5/02; A24B 3/16; A24B 5/04; A24B 5/12; A24B 3/07; A24B 5/06;
(Continued)

(56) References Cited

U.S. PATENT DOCUMENTS 2,422,430 A * 6/1947 Manderscheid .......... B24B 5/35 451/397
2,574,030 A 11/1951 Green
2,989,056 A 6/1961 La Motte
(Continued)

FOREIGN PATENT DOCUMENTS

CN 203427210 U 2/2014
CN 210120896 U 3/2020
(Continued)

*Primary Examiner* — Joseph M Rocca
(74) *Attorney, Agent, or Firm* — McKee, Voorhees & Sease, PLC

(57) ABSTRACT

A method and apparatus are provided for processing plant material to remove leaves from a plant stalk. The apparatus comprises a conveyor for transporting a plant with leaves hanging down from the stalk; and a defoliator mechanism having two opposing surfaces, the opposing surfaces being movable between (i) a disengaged position for receiving leaves hanging down from the conveyor, and (ii) an engaged position in which the opposing surfaces are configured to grip leaves received by the defoliator mechanism; wherein the opposed surfaces act in the engaged position to apply a force on the gripped leaves to separate them from the stalk.

17 Claims, 14 Drawing Sheets

(51) Int. Cl.

| | |
|---|---|
| ***A24B 5/04*** | (2006.01) |
| ***A24B 5/12*** | (2006.01) |
| ***B65G 17/32*** | (2006.01) |
| ***B65G 43/08*** | (2006.01) |

(58) Field of Classification Search
CPC ...... B65G 17/32; B65G 43/08; A01D 34/661; A01D 34/78; A01D 45/16; B02C 19/0056
USPC .......................................... 131/313, 319, 322
See application file for complete search history.

(56) References Cited

U.S. PATENT DOCUMENTS

| | | | | |
|---|---|---|---|---|
| 3,380,460 | A | 4/1968 | Fuis, Jr. et al. | |
| 4,373,323 | A * | 2/1983 | Jones | A01D 45/16 460/134 |
| 4,407,305 | A | 10/1983 | Patterson | |
| 4,679,338 | A * | 7/1987 | Middleton | E01H 1/0809 37/259 |
| 4,836,220 | A | 6/1989 | Miyake et al. | |
| 8,753,180 | B2 | 6/2014 | Hutchins | |
| 2004/0050662 | A1 | 3/2004 | VanBerlo | |
| 2009/0107103 | A1 | 4/2009 | Hutchins | |
| 2012/0131894 | A1* | 5/2012 | Pellenc | B07B 1/15 209/673 |
| 2016/0331019 | A1 | 11/2016 | Evans et al. | |
| 2018/0199509 | A1* | 7/2018 | Ricketts | A01D 45/02 |

FOREIGN PATENT DOCUMENTS

| | | | |
|---|---|---|---|
| EP | 2936959 | A1 | 10/2015 |
| FR | 2448301 | A1 | 9/1980 |
| GB | 809772 | A | 3/1959 |

* cited by examiner

APPARATUS AND METHOD FOR PROCESSING PLANT MATERIAL

CROSS REFERENCE TO RELATED APPLICATIONS

This is a U.S. national phase application claiming priority to PCT/EP2021/063922, filed May 25, 2021, which claims priority to British application No. 102020010446-2, filed May 25, 2020, the entire contents of which are hereby incorporated by reference in their entirety.

FIELD

The present disclosure relates to an apparatus and method for processing plant material to remove leaves from a plant stalk.

BACKGROUND

Defoliation refers to the process of stripping or removing leaves from a plant stalk such as tobacco. FIG. 1 illustrates a tobacco plant 10. The leaves of the plant 10 can be assigned to multiple (e.g. four) different categories according to their position on the stalk 60. For example, as shown in FIG. 1, according to some schemes, the leaves of a tobacco plant are classed as belonging to one of four different categories: lugs 20, cutters 30, bodied leaves 40 and tip leaves 50. (It will be appreciated that other schemes for leaf classification may be used, whether for tobacco or other plants, and these may identify a different total number of possible leaf categories).

At present, tobacco leaves are often removed manually from the stalk or stem of the plant, starting at the bottom with the lugs 20, and then moving up towards the tip leaves 50. In one current method, a first person removes the leaves from the stalk 60 one by one, and separates the leaves by position (class) into lugs 20, cutters 30, bodied (body) leaves 40 and tip leaves 50. During this process, a second person takes about 35 leaves of a given group or class, and ties them together into a bundle 70 (see FIG. 2). Often, a leaf from the same class is used to tie the bundle together.

In another method, a first person removes all the lug leaves 20 and keeps hold of them before passing the plant 10 to a second person who removes the cutter leaves 30. The second person then passes the plant 10 to a third person who removes the bodied leaves 40, and then passes the plant 10 to a fourth person who removes the tip leaves 50. Each person makes a bundle of leaves for their respective leaf group once they have collected an appropriate number of leaves.

However, such a manual approach is becoming more expensive with increasing labour costs, and threatens to represent a bottleneck in tobacco production. Accordingly, a number of machines have been developed to support a more automated processing of plant material. However, existing machines tend to be somewhat limited in functionality, and may also suffer from additional concerns, such as safety.

SUMMARY

The invention is defined in the appended claims.

Various implementations provide a method and apparatus for processing plant material to remove leaves from a plant stalk.

According to one aspect, there is provided an apparatus comprising a conveyor for transporting a plant with leaves hanging down from the stalk; and a defoliator mechanism having two opposing surfaces, the opposing surfaces being movable between (i) a disengaged position for receiving leaves hanging down from the conveyor, and (ii) an engaged position in which the opposing surfaces are configured to grip leaves received by the defoliator mechanism; wherein the opposing surfaces act in the engaged position to apply a force on the gripped leaves to separate them from the stalk. The apparatus further comprises a leaf sorting system configured to separate the defoliated leaves into different categories corresponding to position on the stalk.

According to another aspect, an apparatus is provided for processing plant material to remove leaves from a plant stalk. The apparatus comprises a conveyor for transporting a plant with leaves hanging down from the stalk; and a defoliator mechanism having two rollers, the rollers being movable between (i) a disengaged position for receiving leaves hanging down from the conveyor, and (ii) an engaged position in which the rollers are configured to grip the leaves received by the defoliator mechanism. When the two rollers are in the engaged position, the defoliator mechanism is configured to rotate the two rollers to apply a force to separate the leaves from the stalk. By driving the rotation of both rollers, a greater separation force can be applied to defoliate the leaves from the stalk.

BRIEF DESCRIPTION OF THE DRAWINGS

Embodiments of the invention will now be described, by way of example only, with reference to the accompanying drawings, in which.

DETAILED DESCRIPTION

Figure 1:
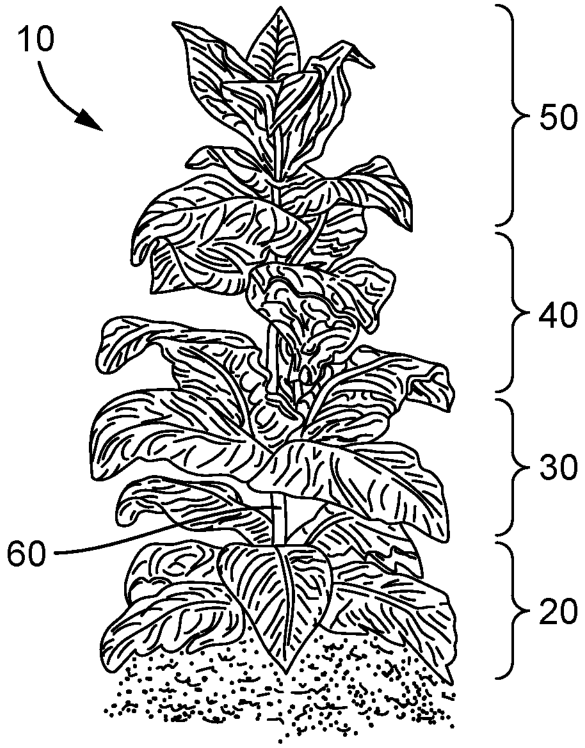
FIG. 1 shows one scheme of allocating the leaves of a tobacco plant to different categories.
Figure 2:
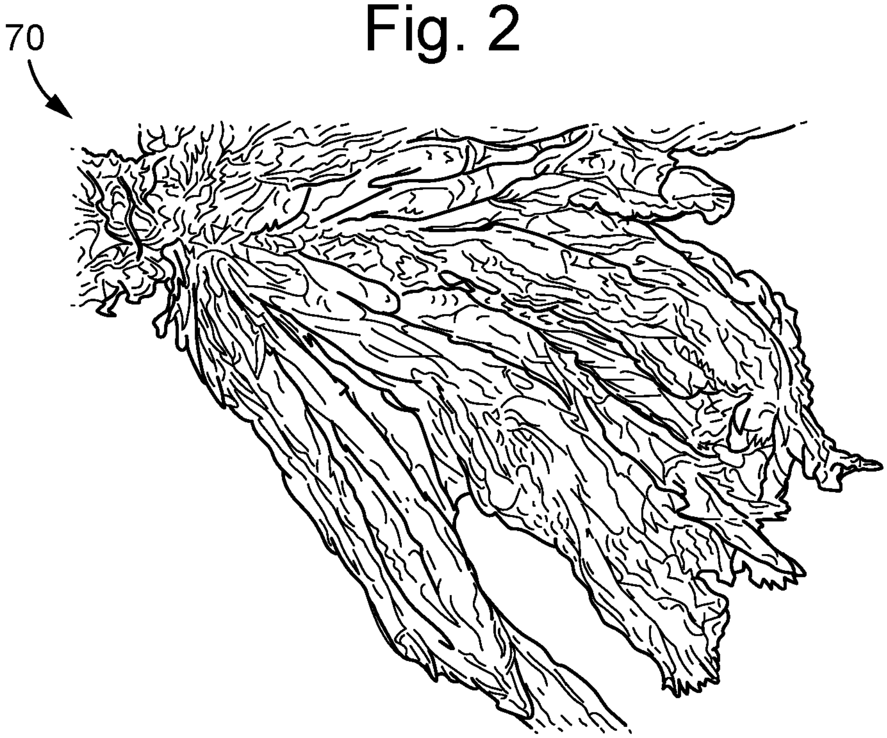
FIG. 2 shows a group of leaves from one particular category tied into a bundle.

The present application provides equipment for mechanically processing plant material to removes leaves from the stalk of a plant such as tobacco and separates the removed leaves according to their position on the stalk (e.g. according to the categories shown in FIG. 1). This processing may be performed on plant material before or after curing the plant material to reduce moisture content (the leaves shown in FIG. 2 were cured prior to defoliation). This (partial) automation of processing reduces the contact between people and plants, which can help to avoid any communication of contaminants. Furthermore, the mechanisation helps to increase the efficiency and speed of the overall process.

Figure 3:
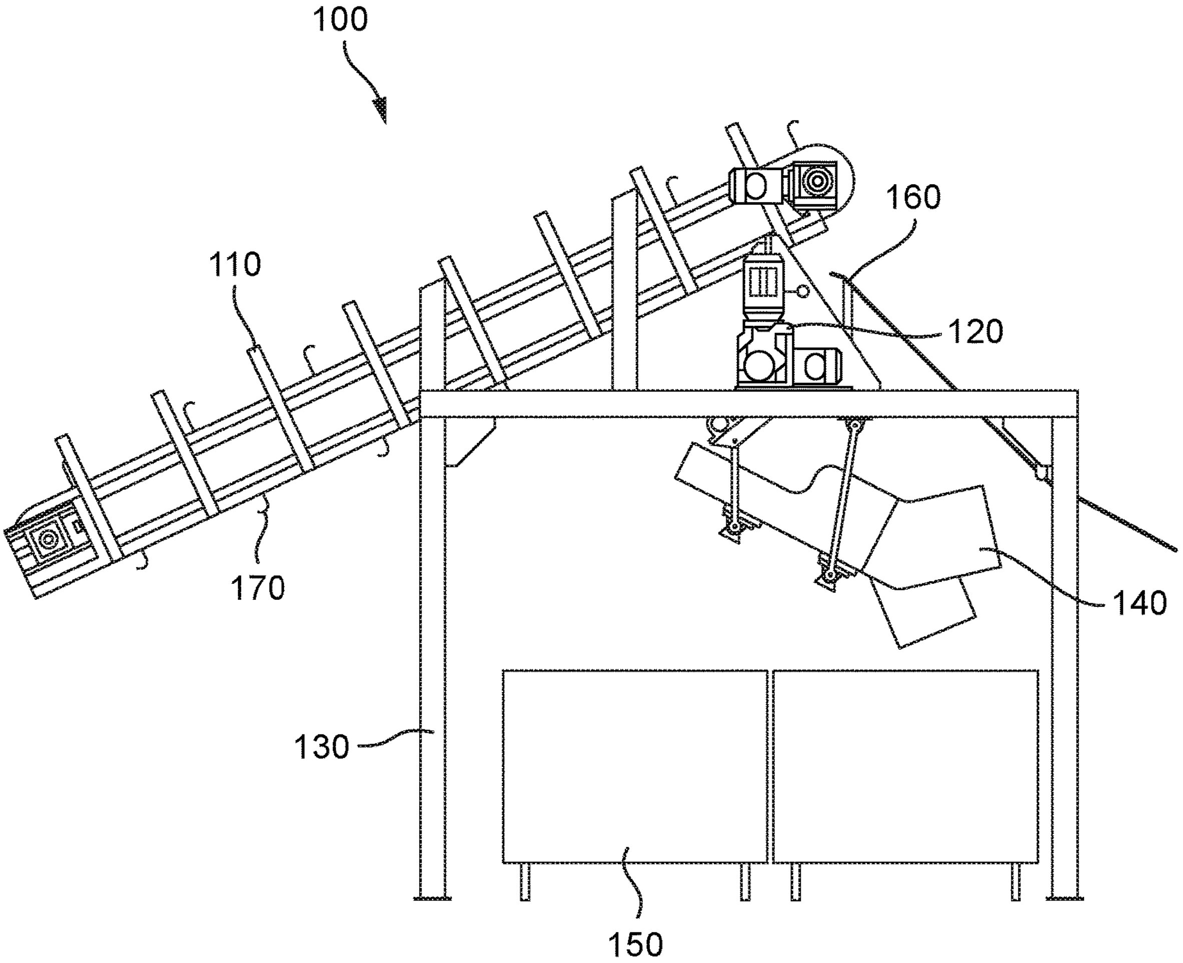
FIG. 3 is a schematic diagram of an example apparatus for processing plant material by defoliating and sorting leaves in accordance with the approach described herein.

FIG. 3 shows an example apparatus 100 for processing plant material in accordance with some embodiments. As shown, apparatus 100 may include a conveyor 110, a defoliator 120, a support structure 130, one or more chutes 140, one or more containers 150 and a disposal mechanism 160.

The conveyor 110 provides a mechanism for positioning a succession of tobacco plants 10 for defoliation. The conveyor 110 may be any mechanism which operates to position successive the tobacco plants 10 near to the defoliator 120 with the leaves of the tobacco plant 10 dangling (hanging down). For example, the conveyor 110 shown in FIG. 3 is a mechanical (powered) conveyor belt or chain, however, other implementations may potentially utilise a gravity-fed slide (in which case the orientation of the conveyor would be different from that shown in FIG. 3, in that there would be a downward slope to the defoliator 120, rather than the upward slope of conveyor 110 shown in FIG. 3).

The conveyor 110 is configured to transport the tobacco plants hanging in a downwards direction (dangling) under gravity. For example, as shown in FIG. 3, the conveyor 110 may have hooks 170 to hold the stalk of the tobacco plant 10. More particularly, the tobacco plants 10 are loaded onto the hooks 170 on the underside of the conveyor 110 (in effect at the left, lowermost portion of the apparatus 100 shown in FIG. 3). The tobacco plants 10 are then transported upwards (and to the right of FIG. 3), towards the defoliator 120, the stalks of these plants being supported by the hooks 170 on the underside of the conveyor. After the leaves have been removed from the plants 10 by the defoliator, the remaining stalks are discarded into the disposal mechanism 160, and the empty hooks then travel (on the topside of the conveyor 110) back down to the loading point to pick up further tobacco plants, and the cycle then repeats. In some examples, the conveyor 110 may implement sensors for use in controlling the positioning of the plants 10 along the conveyor; in other examples, such control may be performed, at least in part, by a human operator.

Figure 4A:
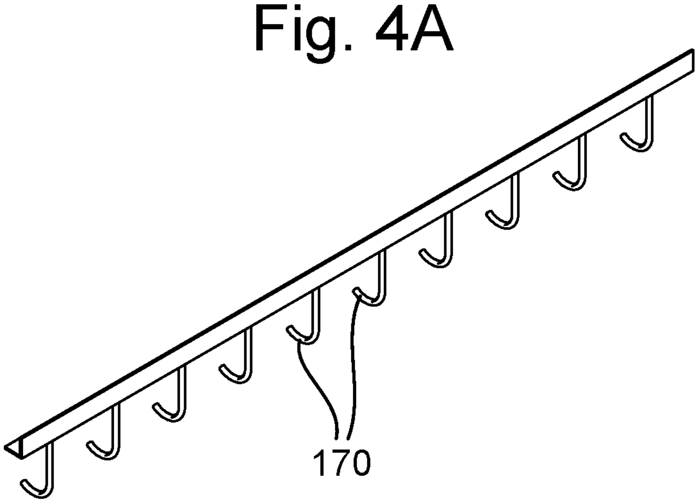
FIG. 4A shows an example row of hooks for use with the apparatus of FIG. 3.
Figure 4B:
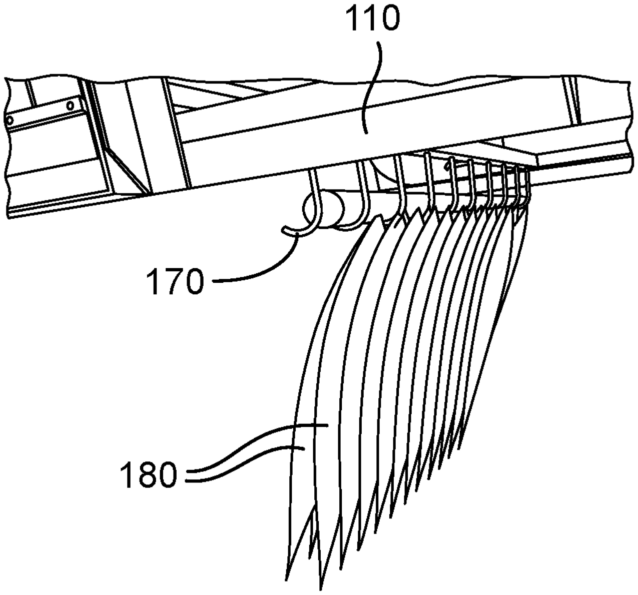
FIG. 4B shows a view of a row of hooks in accordance with FIG. 4A in use with a portion of an apparatus in accordance with FIG. 3.

Note that each hook 170 shown in FIG. 3 may represent a row of hooks (as shown in FIGS. 4A and 4B) arranged perpendicular to the direction of travel of the conveyor 110 (i.e. into the page for FIG. 3). Having a row of hooks 170 in this manner allows one or more plants to lie in a horizontal direction across the row of hooks, perpendicular to the direction of transport. The leaves then hang down in the spaces between the hooks, and are hence accessible for defoliation.

The defoliator 120 provides a mechanism for defoliating (removing) the leaves from the stalk of the tobacco plant 10. The defoliator 120, which is described in more detail below, comprises first and second opposing surfaces, which are configured to be in (i) a disengaged position, substantially apart, or (ii) an engaged position, substantially adjacent. In the disengaged position, the defoliator 120 is configured to receive the tobacco leaves as positioned by the conveyor 110, in other words, the leaves are inserted or received into the space between the opposing surfaces. In the engaged position, the opposing surfaces are brought together to trap or hold the tobacco leaves in position between the opposing surfaces. As discussed in more detail below, the opposing surfaces of the defoliator 120 generally engage the tobacco leaves from the whole length of the plant at the same time.

The defoliator 120 is further configured in the engaged position to pull the leaves downwards away from the stalk, the stalk generally being retained in position by the conveyor 110 and hooks 170, so that the leaves are thereby separated from the stalk. This separation of the leaves from the stalk may be further facilitated by the motion of the conveyor 110 as it transports the stalk onwards and upwards away from the defoliator 120 (although in other implementations, the motion of the conveyor belt 110 may be temporarily halted during the defoliation operation).

In some implementations, each opposing surface may be provided by the outer surface of a cylinder or roller, such that the defoliator 120 comprises a pair of rollers. The axes of the respective rollers are both substantially horizontal and parallel to one another, and primarily offset from one another in a horizontal direction. At least one of the rollers may be rotated such that the portion of the roller surface facing (closest to) the other roller moves in a downwards direction, therefore provide a downward force on any leaves which are trapped (held) between the two opposing surfaces. In such an implementation, it will be appreciated that the two rollers rotate in opposite directions—for example, if the leaves are held between a roller on the left and a roller on the right, the left roller would rotate clockwise and the right roller would rotate anti-clockwise.

In some implementations, one of the rollers is powered to rotate, for example by using a motor, while the other roller is free to rotate around its longitudinal axis. Therefore, as the powered roller rotates to pull the leaves from the stalks, this downward force is transmitted by the leaves to the other roller, which likewise rotates. In some cases, there may be enough direct contact between the rollers in the engaged position for the powered roller to directly rotate the free roller. In other implementations both rollers may be powered to rotate. In some cases, such powered rollers may share a drive system and/or a control system to help ensure synchronisation between the rollers.

There are a variety of other possible implementations for the opposing surfaces. For example, a pair of plates which are connected to linear actuators may be configured to pull the plates in a direction away from the stalk; alternatively opposing circular plates having a coaxial configuration may be rotated together to provide a downward force. In such configurations, the plates would generally be disengaged to receive the leaves, engaged to pull the leaves away from the stalk, and then disengaged to allow the leaves to fall into chute(s) 140 (as discussed in more detail below).

In contrast, when using a pair of rollers, the separation between the opposing surfaces decreases as the pair of rollers is approached in a downwards direction form above. This therefore helps to support a continuous feed into and through the defoliator, even if the rollers are maintained in the engaged position; the plant material is drawn into the increasingly narrow spacing between the rollers, and the continued rotation of the rollers then expels the separated leaves out into chute(s) 140. Nevertheless, in some cases, the rollers may be disengaged to facilitate the receipt of tobacco plants 10 into the defoliator prior to stripping the leaves, and/or the release of the separated (stripped) leaves into the chute(s), depending upon the circumstances of any given implementation (and also potentially on the nature of the leaves to be defoliated).

As shown in FIG. 3, the apparatus 100 may include one or more chutes 140, each of which may be directed to a respective container or bin 150. The chutes 140 may comprise slides, or similar guiding structures which are configured to transport the tobacco leaves defoliated from the plant 10 away from the defoliator 120 and into the containers 150. Each chute 140 may be configured to receive and transport a particular type or category of leaf, and may be positioned underneath an appropriate portion of the defoliator. By type or category of leaf it is meant a portion of the leaves defined in accordance with the relative position of the leaves on the plant. For example types or categories of leaf may be in accordance with categories 20, 30, 40, 50 identified in FIG. 1.

For example, if the defoliator 120 comprises a set (e.g. pair) of rollers, the defoliated leaves will be extruded from between the opposing surfaces of the rollers—hence the top end (opening) of the chutes 140 would be positioned to catch or intercept leaves exiting the defoliator 120 from between the rollers. In some cases, the defoliator 120 may disengage the opposing surfaces to allow the leaves to fall into the chute(s) (as well as, or instead of, extruding leaves by rotating the rollers in the engaged position).

As an example implementation, there may be four individual chutes, with each chute 140 receiving one of the groups or classes of leaves identified in FIG. 1 (i.e. lugs 20, cutters 30, bodied (body) leaves 40 and tip leaves 50). Each chute may then direct the respective class of leaf into a different container 150, thus sorting the leaves according to their position on the stalk. In other examples there may be a different number of containers, for example there may be only a single container, in which case the chute 140 may potentially be omitted—rather a single bin might be positioned directly beneath the defoliator 120. However, even if there is only a single bin or container, a chute 140 might still be utilised to transport the leaves to a container in a more accessible location (rather than directly underneath the defoliator 120). Note also that where there is a single container, a separate apparatus or process (automated or manual) might be used to subsequently sort the leaves into different classes or categories.

As also shown in FIG. 3, the apparatus 100 includes a disposal mechanism 160 which is configured to receive the defoliated stalks from the conveyor 110 and transport them to a disposal area. The conveyor 110 may be configured to release the defoliated stalks as part of the cycle of the conveyor mechanism. For example, as shown in FIG. 3, the hooks 170 may release the stalks when the hooks are rotated to travel in the opposite direction (i.e. when the hooks reach the end of the conveyor belt). Such a release may be accomplished in any suitable manner. For example, if the stalk simply lies across the row of hooks, as mentioned above, then such release will occur automatically (under gravity) as the hooks 170 rotate around the end of the conveyor belt 110 to start their return journey to the loading position. The released stalks then fall onto the disposal mechanism 160, which may comprise a slide or ramp, such as shown in FIG. 3, for transporting the stalks to a disposal area.

In other examples, the disposal mechanism 160 may include a specific mechanism to retrieve the stalks from the conveyor 110, e.g. by pushing or grasping the stalks from the hooks 170. Additionally, in some examples, the conveyor 110 may extend further past the defoliator 120 than shown in FIG. 3, such that the defoliated stalks may be deposited directly into a suitable bin or other container, without having a slide or ramp to transport the stalks away from the conveyor 120.

The apparatus of FIG. 3 also includes a support structure 130 which is configured to support the various components, such as the conveyor 110, the defoliator 120, and so on, in their relative positions within the apparatus 100. The support structure 130 may be made of any suitable material As mentioned above, FIG. 4A shows a row of hooks 170 for use with a conveyor 110. Each row of hooks 140 is attached to the conveyor 110, which moves the row of hooks from the loading position towards the defoliator 120 (and then around and back to the loading position).

As further shown in FIG. 4B, the row of hooks 170 are used to engage and support the stalks of the tobacco plants 10. In particular, the tobacco plants 10 are placed on the hooks 170 with their stalks lying in a substantially horizontal direction, i.e. parallel to and across the row of hooks, with the leaves 180 dangling (hanging) down between the hooks. Potentially multiple tobacco plants may be placed on a single row of hooks, provided there is space for all the leaves to hang down.

The width of the row of hooks is generally comparable with the length of the stalks. Thus if the stalks were much longer that the row of hooks, the ends of the tobacco plant might sag downwards; conversely, having the row of hooks much wider than the length of the stalks would leave part of the row unoccupied, which would be a rather inefficient use of space. (On the other hand, having a wider row of hooks might support placing multiple tobacco plants in series across a row to increase overall throughput).

In operation, it is expected that the tobacco plants 10 will be placed into the hooks 170 with a consistent orientation—e.g. with the bottoms of the stalks all adjacent one side of the conveyor and the tops of the stalks all adjacent the other side of the conveyor (where the tops and bottoms of the stalks are with respect to the growing orientation of the plants 10). With this consistent orientation, the leaves hang separately in a position across the row determined by their respective position on the stalk. In particular, each different type of leaf (lugs 20, cutters 30, bodied 40 and tips 50) will correspond to a substantially consistent position across the width of the row of hooks; this helps to support automated sorting of the defoliated leaves into different types, as described in more detail below.

In the example shown in FIG. 4B, the row of hooks 170 is positioned horizontally and perpendicular to the direction of conveyance of the conveyor 110. In other implementations, different configurations may be used for the hooks (and rows of hooks). For example, a row of hooks may be parallel (rather than transverse) to the direction of conveyance; this will generally involve the defoliator 120 and other components being repositioned and reoriented accordingly.

In some implementations, the row of hooks may be set (or configurable to) a slant to the horizontal. One reason for such an arrangement might be to accommodate different heights (lengths) of stalk. In other words, increasingly taller (longer) stalks may be placed at an increasingly greater slant, such that the horizontal extent of the row is consistent across different stalk lengths. With this approach, the different types of leaf (lugs 20, cutters 30, bodied 40 and tips 50) will continue to have a substantially consistent position across the (horizontal) width of the row of hooks, even in the case of different plant sizes, to help support automated sorting of the leaves.

Figure 5:
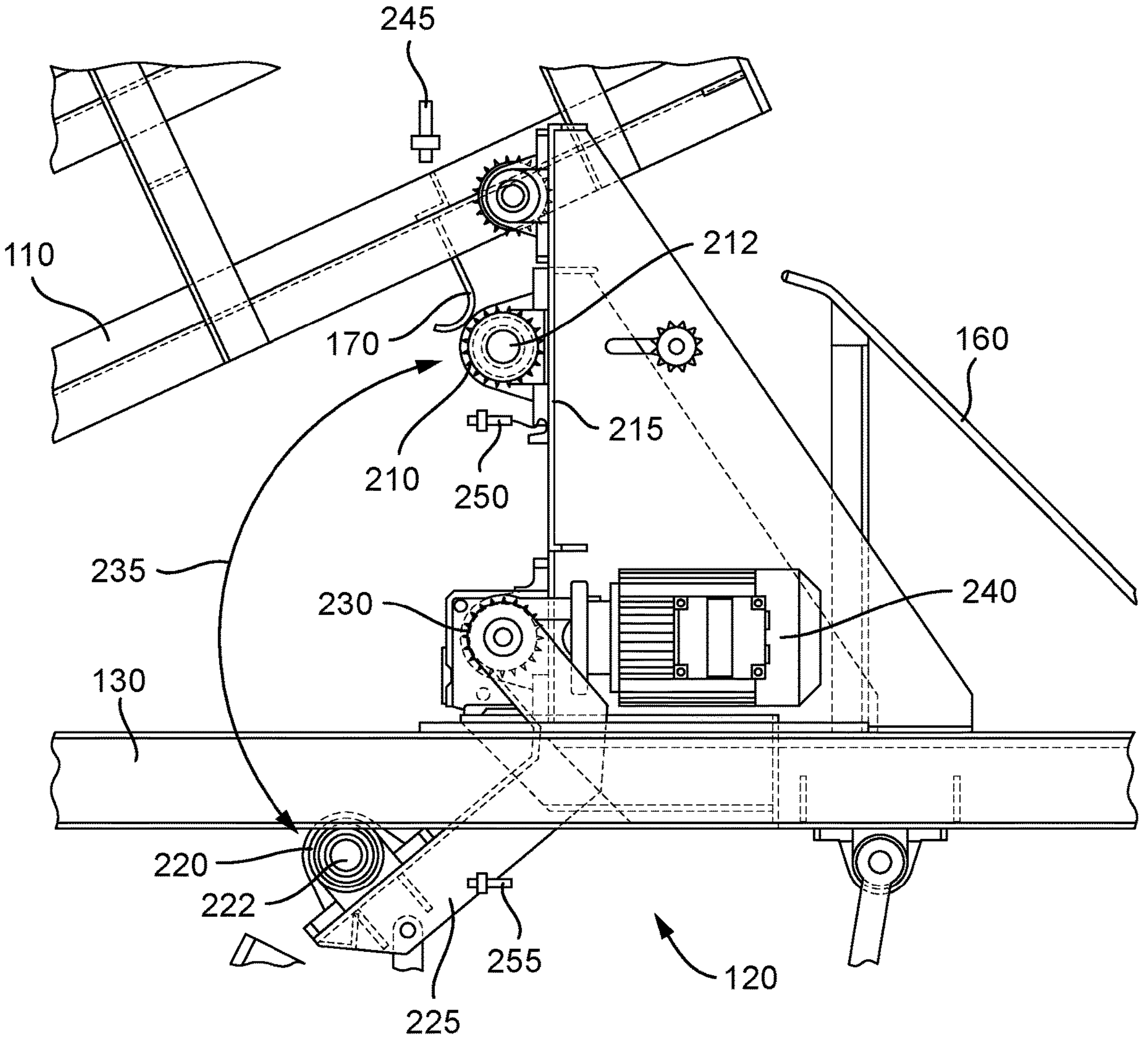
FIG. 5 is a schematic diagram of a portion of an example apparatus for processing plant material by defoliating and sorting leaves in accordance with the approach described herein.

FIG. 5 shows an example of defoliator 120 in the disengaged position in accordance with some embodiments. Additionally, FIG. 5 shows the relative position of certain other components of the apparatus 100. The defoliator 120 of FIG. 5 includes a first opposing surface 210, which is an external surface of a first roller 212 attached to a first arm 215, and a second opposing surface 220, which is an external surface of a second roller 222 attached to a second arm 225. Each roller 212,222 is attached to their respective arm 215,225 in a suitable manner to allow the rollers to rotate whilst being supported by the arm.

The rollers 212, 222 are movable with respect to each other to provide the disengaged and engaged positions. Thus in the example shown in FIG. 5, the first arm 215 is fixed, hence the position (axis) of the first roller 212 is held fixed. In contrast, the second arm is mounted on a pivot joint 230, such that the second arm 225 is operable to rotate with respect to the first arm 215 around the pivot joint 230 to move the second roller 222 between a disengaged position (as shown in FIG. 5) and an engaged position adjacent the first roller 212. This movement of the second roller 222 in FIG. 5 is indicated by arrow 235, which denotes the change in position of the second roller 222 as the defoliator 120 is switched between a disengaged position, with the opposing surfaces 210, 220 substantially apart, and an engaged position, with the opposing surfaces 210,220 substantially adjacent. In other implementations, both of the first and second rollers 212, 222 may be movable to switch the defoliator 120 between the disengaged position and the engaged position.

Note that in the disengaged position, the second roller 222 is moved well away from, and below, the first roller 212. This allows leaves suspended from the conveyor 110 clear access to the first roller 212 as they travel to the defoliator, without being impeded by the second roller. When the leaves for a plant abut or are close to the first roller 212, the second roller is now moved up into the engaged position, thereby closing in on the hanging leaves, such that they are gripped between the first and second rollers.

The defoliator 120 includes an actuator 240, for example an electric motor, which operates to move the defoliator 120 between the disengaged position and the engaged position (as per arrow 235), and also to rotate the second roller 222 using a drive mechanism contained in arm 225 to perform the defoliation. Other implementations may have different arrangements of actuators, motors etc. For example, in some cases, two separate actuators may be provided to rotate each respective roller, or a single actuator may be provided to power the rotation of both rollers. The actuator(s) used for rotating the roller(s) may be the same as or different from the actuator(s) used to move the defoliator 120 between the disengaged and engaged positions. In some cases the movement between the disengaged and engaged positions might be controlled and performed manually.

FIG. 5 further shows sensors 245, 250 and 255 that are part of apparatus 100. These sensors help to support automated operation of the apparatus 100 and/or the safety and reliability of such operation. For example, measurements from the sensor(s) may act as trigger to initiate and/or terminate at least one control task according to the particular measurement readings.

For example, a first sensor 245 may be used to help position the tobacco plant 10 in the correct location relative to the defoliator 120 prior to engagement of the opposing surfaces 210, 220. Thus as the conveyor 110 transports a plant 10 using hooks 170, towards the defoliator 120, the sensor 245 may detect when the hooks 170 (and the leaf carried thereby) are now located immediately above the defoliator; such a detection might then trigger a control task such as a temporary halt in the motion of the conveyor belt and/or an engagement of the first and second opposing surfaces 210, 220 of the defoliator 120. As such, this control task may be triggered by the sensor 245 indicating that the conveyor has transported a plant to a target position relative to the first and second opposing surfaces. The first sensor 245 might also be able to detect the lateral position of the tobacco plant 10 on the hooks (i.e. in a horizontal direction transverse to the travel direction of the conveyor belt). It may then be possible to move the hooks sideways (in a transverse direction), for example if the hooks are mounted on a movable carriage (not shown in the drawings) to help properly align the plant with chutes 140 for the different leaf types.

A second sensor 250 shown in FIG. 5 might be used to determine whether or not leaves 180 (e.g. a feature of a plant) are present between the opposing surfaces 210, 220 of the defoliator. If there are leaves present, this may initiate rotation of the first and/or second rollers 212, 222, to commence the defoliation. Conversely, if subsequently the second sensor 250 detects that the leaves are no longer present, the second sensor may provide a control signal to stop rotation of the first and/or second rollers 212, 222 and to disengage the opposing surfaces 210, 220. As such, one or more control tasks may be triggered based on the presence or absence of one or more leaves of the plant, wherein the one or more sensors indicate the presence or absence of one or more leaves. Alternatively or additionally, a sensor might be provided to indicate the presence (or absence) of the stalk. In these examples, one or more control tasks are triggered based on the sensed presence or absence of a stalk of the plant.

A third sensor 255 may be utilised to determine whether the defoliator 120 is in the disengaged or engaged position. It will be appreciated that in some implementations, there may be a single overall control system which receives data from the various sensors 245, 250, and 255, and uses this information before making control decisions for the apparatus 100 as a whole. In other implementations, the control functionality might be more distributed (at least in part); for example, a given sensor might be used directly to initiate (or terminate) a given control operation, such as discussed above.

Figure 6A:
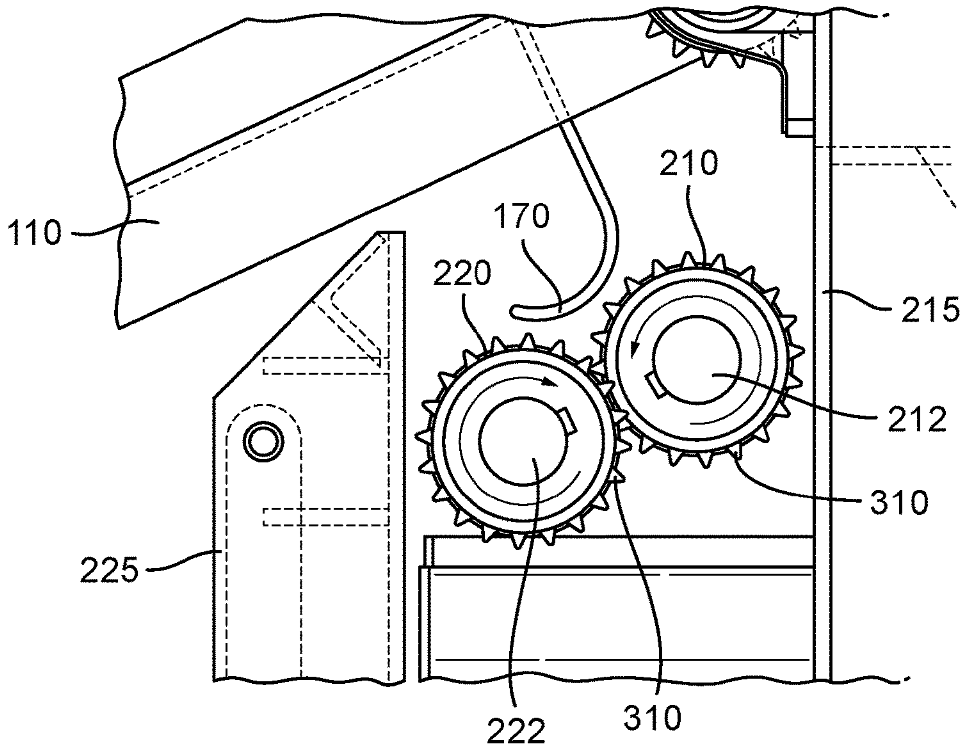
FIG. 6A shows a view of an example defoliator in accordance with the approach described herein.

FIG. 6A shows a detailed view of the first and second rollers 212, 222 in the defoliator 120 of FIG. 5. In contrast to the depiction of the defoliator 120 in FIG. 5, the defoliator of FIG. 6A is in the engaged position, so that the first and second rollers 212, 222 are in close proximity to one another, whereby the opposing surfaces 210, 220 are adjacent. The rollers 212, 222 may be made of any suitable material, such as metal, plastic, etc.

As shown by the directional arrows on each of the rollers 212, 222, the opposing surfaces 210, 220 are rotated to provide a downward force (typically frictional) on leaf material located between the rollers 212, 222. In particular, with the left-hand roller 222 rotating clockwise and the right-hand roller 212 rotating anti-clockwise, the force applied to the leaf material between the opposing surfaces 210, 220 is substantially in a direction away from the hooks 170 and conveyor 110. It will be appreciated that if the force applied by the rollers 212, 222 is greater than the force attaching the leaves to the stem (stalk), the leaves will be separated from the stalk.

The gripping strength, e.g. the frictional force applied to the leaves, is dependent on compression of the leaves between the opposing surfaces 210, 220, along with any resilience of the opposing surfaces themselves, and/or (spring) loading together of the opposing surfaces 210, 220. For example, if the actuator 240 (see FIG. 5) controls the arm 225 to push the second roller 222 against the first roller 212, the grip strength may be enhanced.

In the implementation shown in FIG. 5, the first roller 212 has a resilient mounting that supports a small amount of lateral movement, i.e. towards and away from the second roller (in the engaged position). This mounting may bias the first roller 212 towards the second roller 222, such that the two rollers touch one another in the absence of any leaves. However, as leaves 180 are introduced between the first and second rollers in the engaged position, the first roller is pushed by the leaves slightly away from the second roller, against the resilient mounting, therefore creating space between the rollers to accommodate the leaves.

The surface of one or both of the opposing surfaces 210,220 may be textured to enhance grip strength. For example, in FIG. 6A the opposing surfaces are provided with a series of spikes or studs 310 distributed across each of the surfaces. The spikes on the opposing surfaces 210, 220 may be configured to interdigitate in the region of closest contact, thereby forcing the leaves at least partially into a zig-zag arrangement between the spikes. In some cases, the spikes 310 may pierce the leaves, which may further increase the downward force (traction) applied to the leaves by the rotating rollers.

In other implementations, the texturing of one or both of the opposing surfaces may comprise providing a pattern of ridges and troughs, or short studs, or any other form of roughening or texturing. It is also possible for the outer surface of one or both of the rollers to be made resilient, e.g. by using a rubber outer layer. This rubber layer would then be compressed in the region of closest contact between the surfaces, and so enhance grip strength. Note that multiple such approaches may be used in conjunction with one another (e.g. a roller surface may be both resilient and textured); also the two opposing surfaces may be different from one another, or may share the same texturing, etc.

Figure 6B:
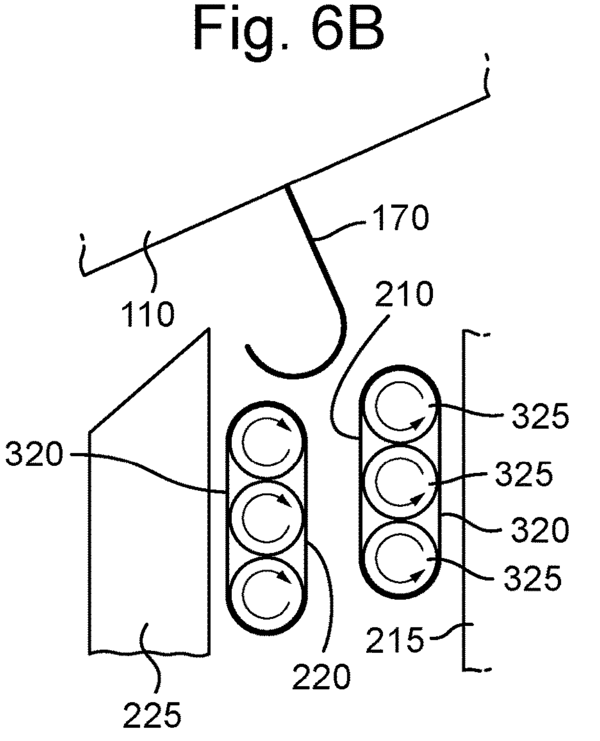
FIG. 6B shows a view of a further example defoliator in accordance with the approach described herein.

FIG. 6B provides another example of a defoliator 120 having two opposing surfaces 210, 220. In contrast to the defoliator 120 of FIG. 6A which has first and second rollers 212,222 to provide the opposing surfaces, each opposing surface in the defoliator 120 of FIG. 6B comprises a belt or track 320 which may be driven to rotate the surface of the belt. For example, the rotatable belt 320 can be rotated by driving one or more of a set of multiple (e.g. 3) rollers 325 located within the belt. This use of a belt 320 helps to increase the area of contact between the two opposing surfaces 210, 220, which is another way to help enhance the grip strength. The area of contact may be further increased if so desired by having more rollers in the set of rollers located within each belt. Additionally (or alternatively), one or both opposing surfaces of the belt 320 may be textured or roughened, for example, by forming ridges, spiked and/or studs on the surface as described above, in order to help further enhance grip strength.

Figure 6C:
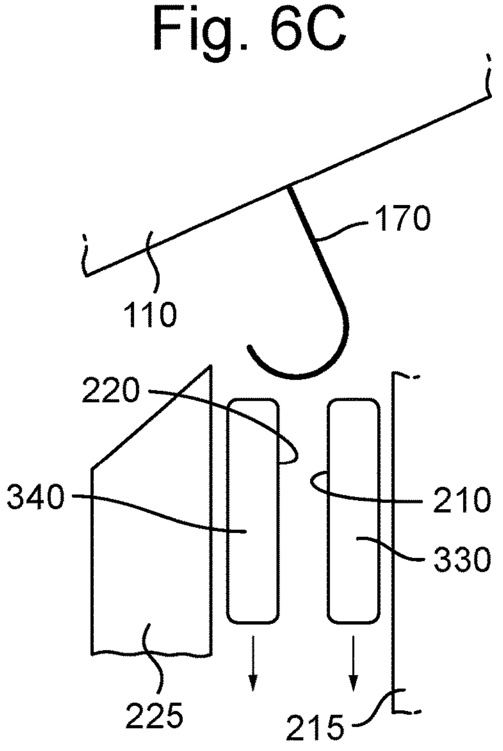
FIG. 6C shows a view of a still further example defoliator in accordance with the approach described herein.

FIG. 6C provides another example of a defoliator 120, in which the two opposing surfaces 210, 220 are provided by two opposing plates 330,340. The plates 330,340 may be moved (actuated) between an engaged position of reduced separation and a disengaged position of increased separation (analogous to the rollers 212, 222 described above). In the disengaged position, the plates are separated to allow the defoliator 120 to receive a plant, while in the engaged position, the plates 330, 340 are brought together to grip the leaves 180. In the engaged position, the plates are further moved downwards, away from the conveyor, thereby providing a downward force on the leaves to defoliate a plant 10). After such defoliating, the opposing surfaces 210,220 may be disengaged (separated) to release the defoliated leaves. Again, one or both of the opposing plates may be textured or roughened, for example, by forming ridges, spiked and/or studs on the surface as described above, in order to further enhance grip strength.

Figure 7A:
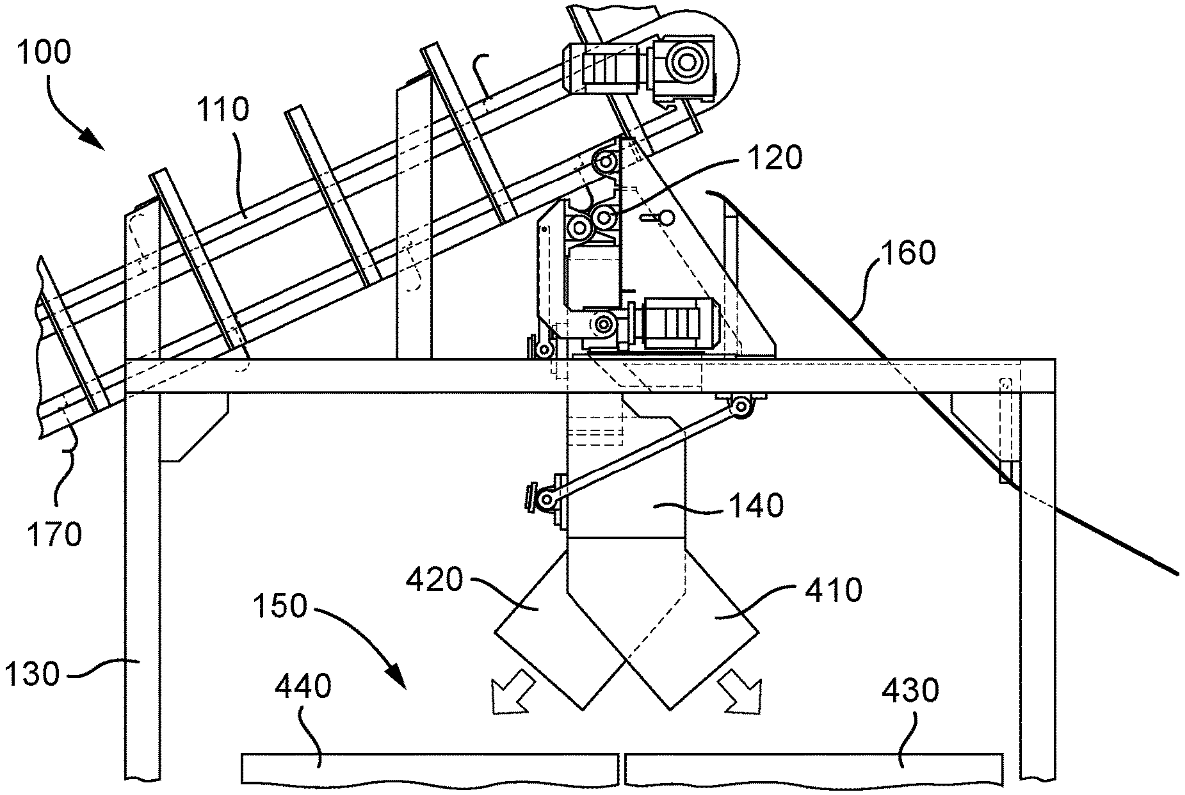
FIGS. 7A and 7B show a side and rear view, respectively, of an example apparatus for processing plant material by defoliating and sorting leaves in accordance with the approach described herein.
Figure 7B:
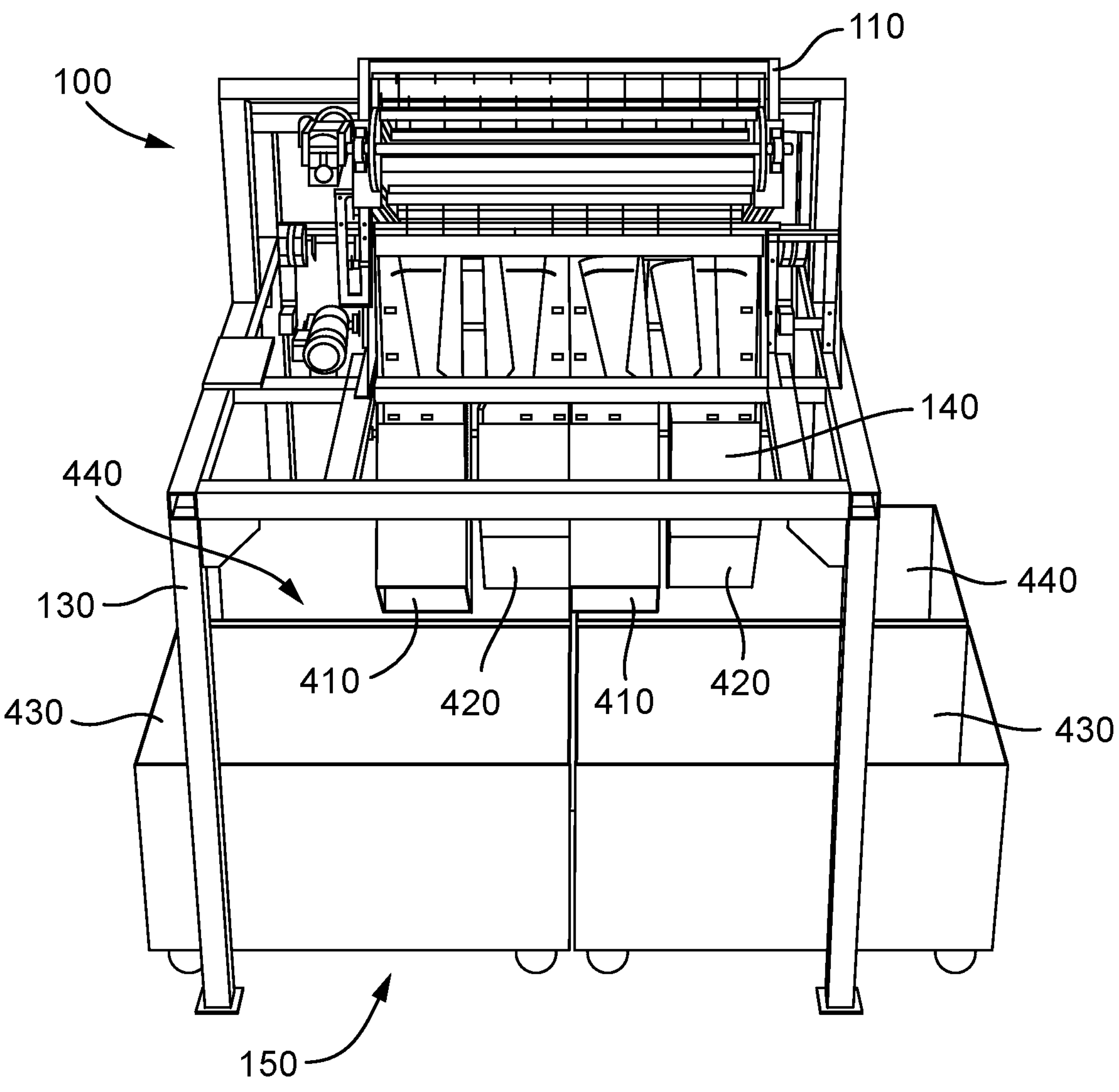

FIGS. 7A and 7B show a side view and a rear view of apparatus 100 for processing plant material in accordance with some embodiments (where the rear view corresponds to the end furthest from the loading position). The defoliator 120 shown in FIG. 7A is in the engaged position. Note that in FIG. 7B, the disposal mechanism 160 is omitted for greater visibility of the other components.

The apparatus 100 is shown in FIG. 7B to be provided with four chutes 140 and four corresponding containers 150, each pair of chute and corresponding container being used to collect a respective leaf type (see FIG. 1). As can be seen by comparing FIGS. 3 and 7A, the chutes change position between the disengaged position of the defoliator (FIG. 3) and the engaged position of the defoliator (FIG. 7A). This movement of the defoliator allows easier access to the containers 150 when the defoliator is disengaged (for example, to empty and replace a container).

As previously described, in the operation of apparatus 100, plants 10 are transported by the conveyor 110 with their stems horizontal and perpendicular to the direction of travel. FIG. 7B shows that the top of the chutes 140 are arranged in a line parallel to the stems, with each chute corresponding to the location of a respective leaf type (for the four leaf types shown in FIG. 1). This allows the defoliator to drop defoliated leaves in particular chutes 140 according to their attached position on the stem. In apparatus 100, two of the chutes 140 include a forward-angled portion 410, and two of the chutes 140 include a rear-angled portion 420, which allows the containers 150 to be arranged in a square, with two front bins 430 and two rear bins 440. The two forward angled portions 410 of the chutes direct defoliated leaves into respective front bins 430 and the two rear angled portions direct defoliated leaves into respective rear bins 440.

It will be appreciated that this arrangement of chutes 140 and bins is provided by way of example only, and many other variations are possible. For example, the four containers might be provided in a line of four elongated bins, such that each chute might drop straight down to a respective container without any angled portions. Furthermore, other implementations may have a different number of containers and/or chutes according to the particular plant processing requirements.

Figure 8A:
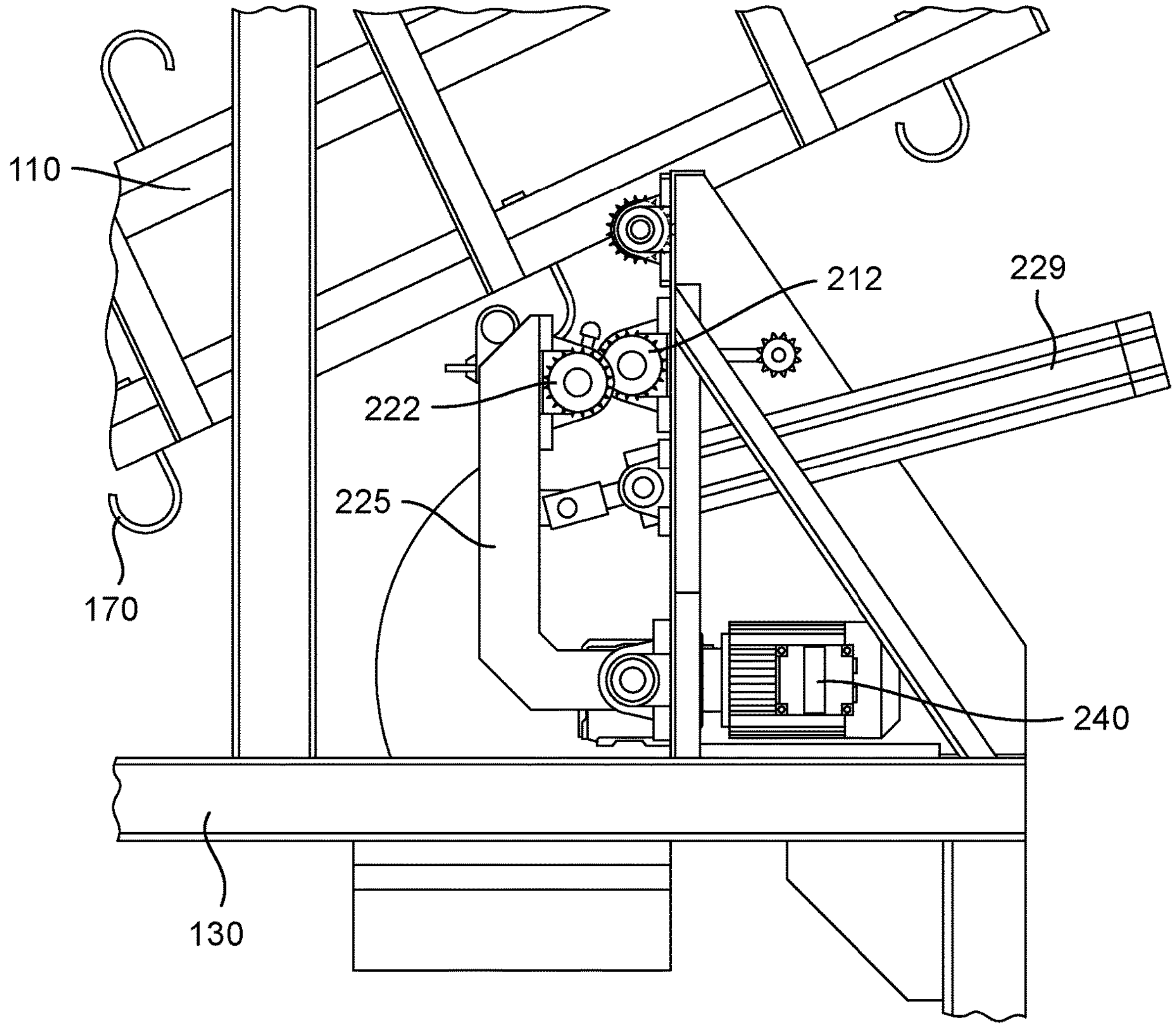
FIGS. 8A and 8B show a side and front view, respectively, of another example apparatus for processing plant material by defoliating and sorting leaves in accordance with the approach described herein.
Figure 8B:
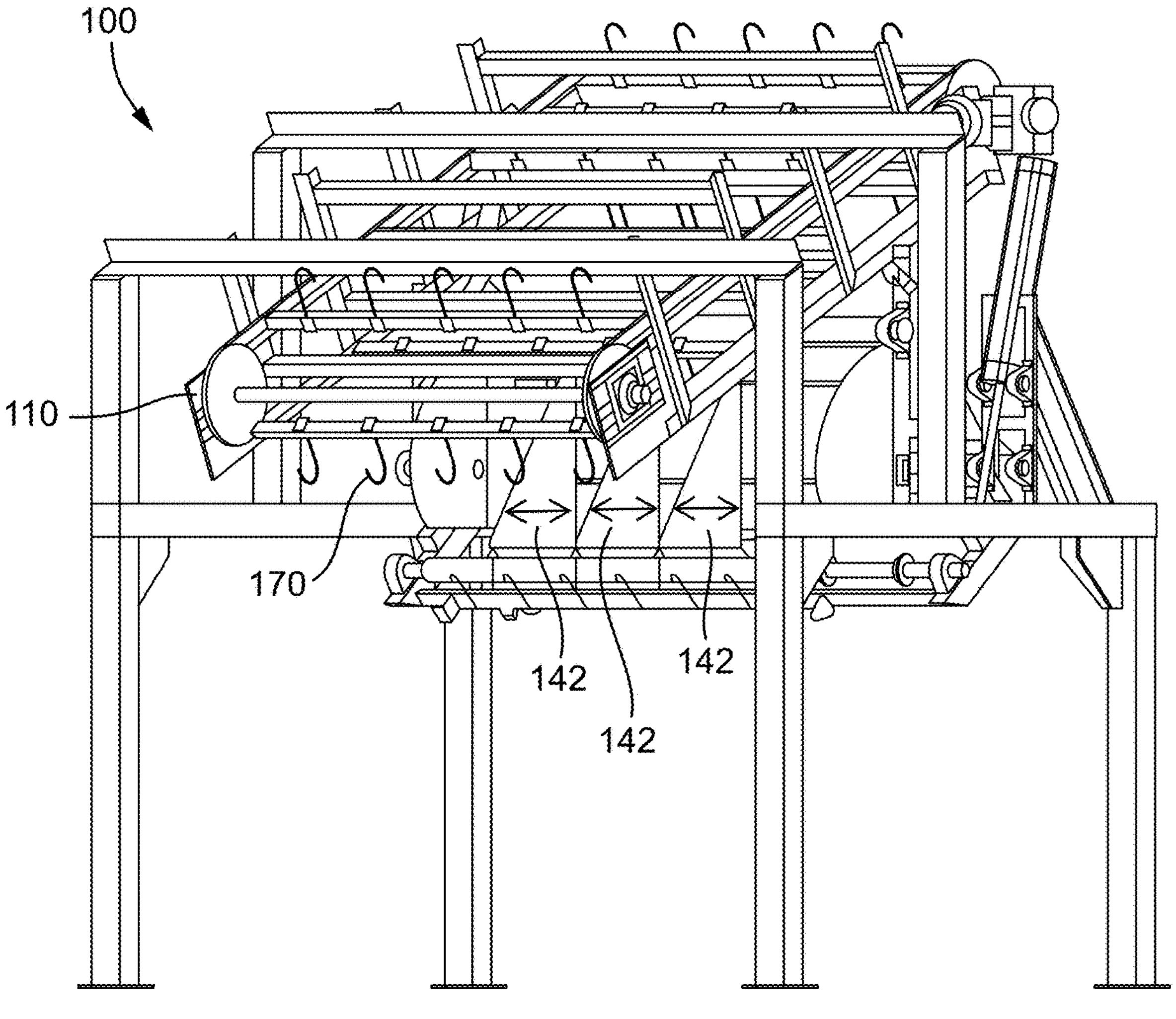

FIGS. 8A and 8B show a side and front view, respectively, of another example apparatus for processing plant material by defoliating and sorting leaves in accordance with the approach described herein. Many aspects of this example are the same or similar to the example described above in relation to FIGS. 7A and 7B, hence for conciseness, we will only discuss herein two main differences of the example of FIGS. 8A and 8B (compared with the example of FIGS. 7A and 7B).

The first of these differences is that in the second example (i.e. that shown in FIGS. 8A and 8B) the movement of the second roller 222 to engage/disengage with the first roller 212 is driven by a pneumatic system (rather than an electric motor). The pipe 229 shown in FIG. 8A forms part of this pneumatic drive system. Note that actuator 240 may be retained as part of pneumatic control system as shown in FIG. 8A (but modified to operate with the pneumatic control system instead of with an electric motor, such as provided for the implementation of FIG. 7A). Alternatively, in other implementations the actuator 240 may be omitted. (Note that in general the rotation of at least one of the two rollers 212, 222 is still driven by one or more electric motors, as described above).

The second difference is that the chutes 140 for guiding the defoliated leaves into containers 150 are replaced by plates 142 (see FIG. 8B). The example illustrated in FIG. 8B has four plates, one for each leaf type in the same way as the example of FIG. 7B. However, other implementations may have a different number of plates according to the desired separation of leaves. The plates 142 may each be formed for individual attachment to the support structure 130, or alternatively the plates 142 may be formed as part of an overall (monolithic) element which is then attached to the support structure 130. The skilled person will be aware of other potential configurations, for example, the apparatus 100 may be fitted with two pairs of plates.

In operation, the leaves slide down the plates under the force of gravity after they have been defoliated from the stalk. The plates may be flat (planar) or they may be contoured, at least in part. For example, a plate may be configured to form a valley or channel (whether relatively deep or relatively shallow) to help guide the leaves away from the defoliator. Note that the plates 142 may support a faster throughput of leaves than chutes 140, thereby supporting a faster overall rate of defoliation (although the chutes 140 may provide greater control in terms of the separation and destination of the leaves).

Figure 9A:
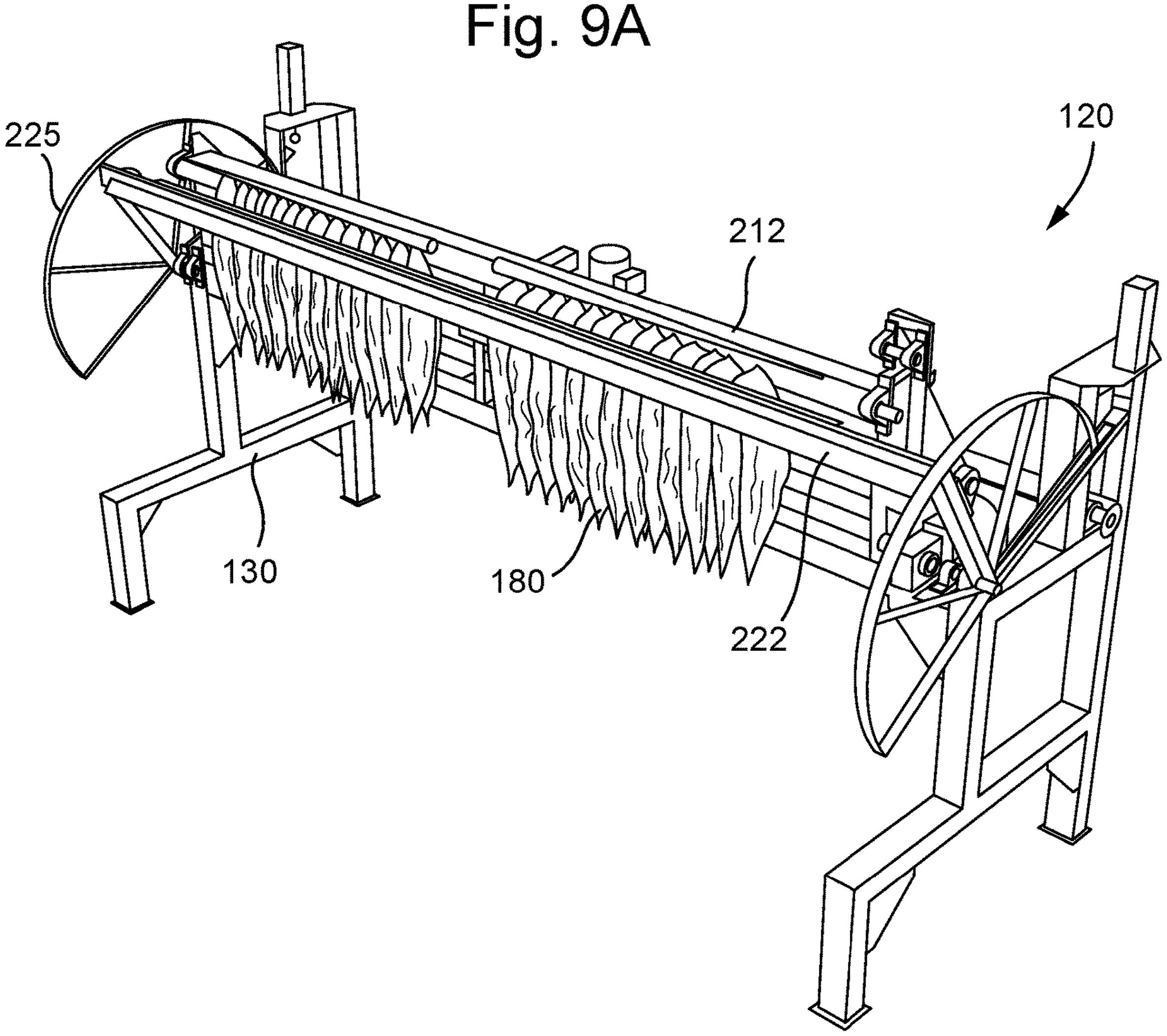
FIGS. 9A-9F show various examples of apparatus (or parts thereof) for processing plant material by defoliating in accordance with the approach described herein.

FIGS. 9A-9F show various examples of apparatus (or parts thereof) for processing plant material by defoliation in accordance with the approach described herein. FIG. 9A shows a defoliator mechanism 120 and part of a support structure 130 of an apparatus for defoliating plants (other portions of the apparatus, such as a conveyor and hooks, are omitted for clarity). The defoliator mechanism 120 comprises rollers 212 and 222, the former being fixed, the latter being movable between an engaged and a disengaged position. In particular, the roller 222 is supported at each end by arms 225 (only one of which is labelled in FIG. 9A). The arm 225 is part of a semi-circular frame which can be rotated (manually or automatically) to move roller 222 between the engaged and disengaged positions. Compared with implementations described above, the defoliator mechanism 120 is twice as wide to allow processing of two plants at the same time, i.e. in parallel, as indicated by the two groups of leaves 180 shown in FIG. 9A, each group corresponding to a separate plant suspended by hooks 170 from conveyor belt 110. It will be appreciated that having such a wider defoliator mechanism 120 therefore provides a greater throughput (rate) and capacity for defoliating plants. It will be appreciated that the width of other components of the apparatus is likewise increased to match the increased width of the defoliator mechanism 120 (the width direction being transverse to the direction of travel of conveyor 110). It will further be appreciated that although FIG. 9A shows a width to defoliate two plant stalks at the same time, it may also be feasible for such an apparatus to be wider still, i.e. to defoliate three or more plant stalks at the same time.

Figure 9B:
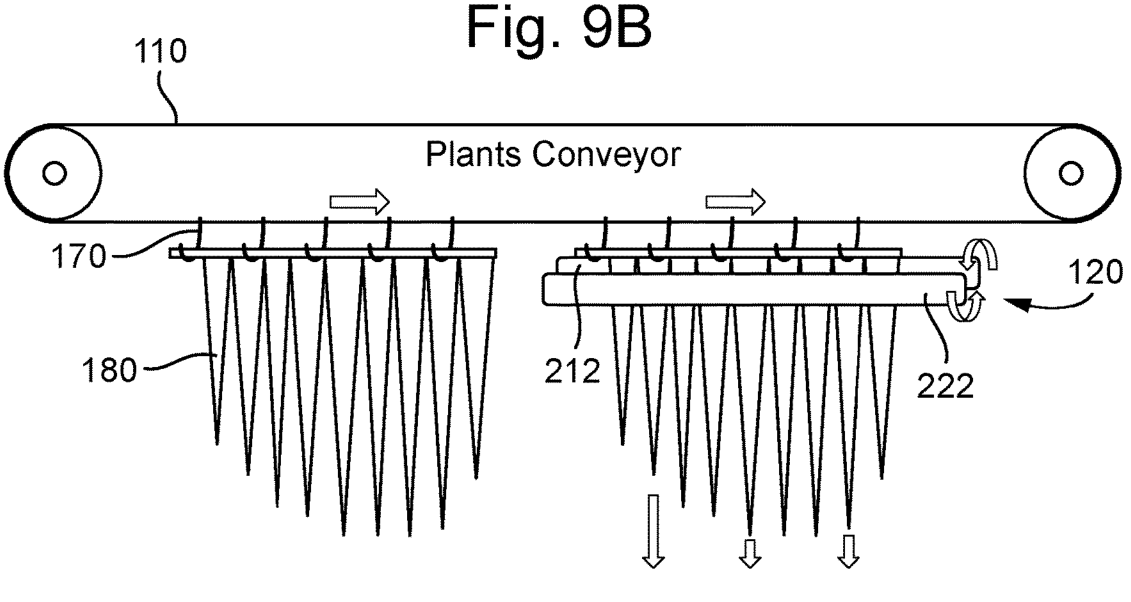

FIG. 9B shows a conveyor belt 110 and defoliator mechanism 120 of another apparatus for defoliating plants (other portions of the apparatus, such as a support structure, are omitted for clarity). The leaves 180 hang down from hooks 170 which in turn are suspended from conveyor belt 110 to move the leaves to defoliator 120, which comprises a pair of rollers 212, 222 as described above. Compared with the previously described implementations, the hooks 170 have a longitudinal arrangement whereby the stalks of the plants are arranged to lie in a direction parallel to (rather than transverse to) the direction of travel by conveyor belt 170. There is a corresponding change in alignment of the rollers 212, 222 of the defoliator mechanism, which are now likewise parallel to the direction of travel by conveyor belt 170. Other portions of the apparatus, such as the leaf sorting system, are to be aligned accordingly (not shown in FIG. 9B). It will be appreciated that whereas the implementation of FIG. 9A has an increased width of the apparatus (compared for, example with the configuration of FIG. 7B), the implementation of FIG. 9B decreases the width (compared again to the configuration of FIG. 7B). This may be beneficial according to the space available for the apparatus.

Figure 9C:
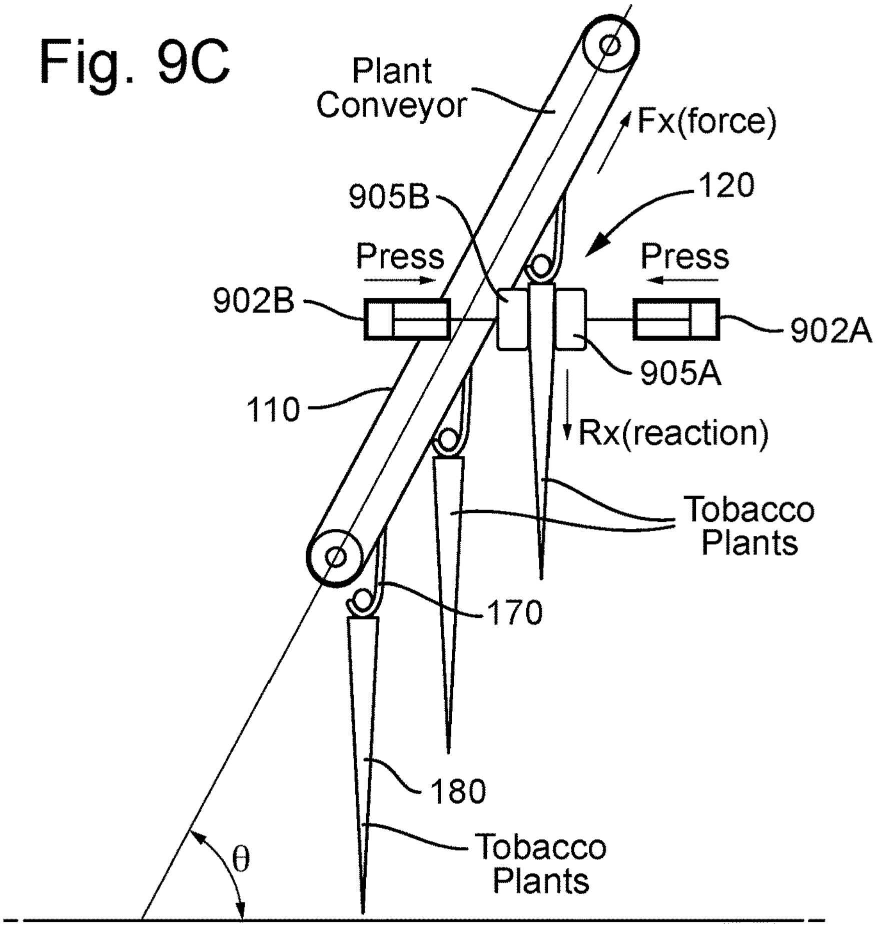

FIG. 9C shows a conveyor belt 110 and a defoliator mechanism 120 of another apparatus for defoliating plants (other portions of the apparatus, such as a support structure and any leaf sorting system, are omitted for clarity). The leaves 180 hang down from hooks 170 which in turn are suspended from conveyor belt 110 to move the leaves to the defoliator 120. Compared with implementations described above, the angle of inclination of the conveyor 110 to the horizontal (indicated as θ) is much greater. In particular, the inclination angle θ in FIG. 9C is approximately 70 degrees, but in other implementations 6 may be any other suitable value, such as approximately 20, 30, 40, 50 or 60 degrees. In general, the inclination angle may be $a<\theta<b$ where a is selected from the angles 20, 30, 40, 50 or 60 degrees, and b is selected from the angles 40, 50, 60, 70 or 80 degrees (subject to the condition $a<b$). Note that if θ approaches too close to 90 degrees, the conveyor 110 is almost vertical, and the leaves will hang down very close to the conveyor, which may hamper defoliation.

The defoliator mechanism 120 in FIG. 9C is also different from previously described defoliators and comprises two opposing surfaces, provided by blocks 905A, 905B. Each block has a corresponding actuator 902A, 902B, for moving the opposing surfaces together into the engaged position, or apart, into the disengaged position. (In some implementations, one of the blocks may be fixed, and only one of the blocks is movable to change between the engaged and disengaged positions). Unlike the rollers shown in FIGS. 9A and 9B, the opposing surfaces do not drive the leaves 180 downwards (away from the stalk), but rather the opposing surfaces clamp the leaves in place (in the engaged position). However, as the conveyor belt continues in motion, it lifts the stalks higher, away from the defoliation mechanism 120, thereby creating a separation force between a stalk which is being lifted, and the leaves attached to the stalk, which are clamped between the two opposing surfaces. Thus once the stalk has been raised sufficiently far by the conveyor belt 110 to cause the separation force to remove the leaves 180 from the stalk, the two opposing surfaces can be moved back to the disengaged position to release the defoliated leaves, which then fall into a leaf sorting system or similar.

One advantage of the apparatus of FIG. 9C is that the defoliator mechanism is relatively simple—the two opposing surfaces only have to be moved together and apart between the engaged and disengaged positions, but without any additional motion (such as rotation). However, the defoliation mechanism shown in FIG. 9C may be somewhat slower than a roller-based defoliation mechanism (such as shown in FIGS. 9A and 9B), since the rollers 212, 222 will tend to eject leaves from the defoliator as they spin while still in the engaged position, whereas the defoliation mechanism shown in FIG. 9C releases the leaves 180 as the two opposing surfaces are returned to the disengaged position and hence release their clamping of the leaves.

Figure 9D:
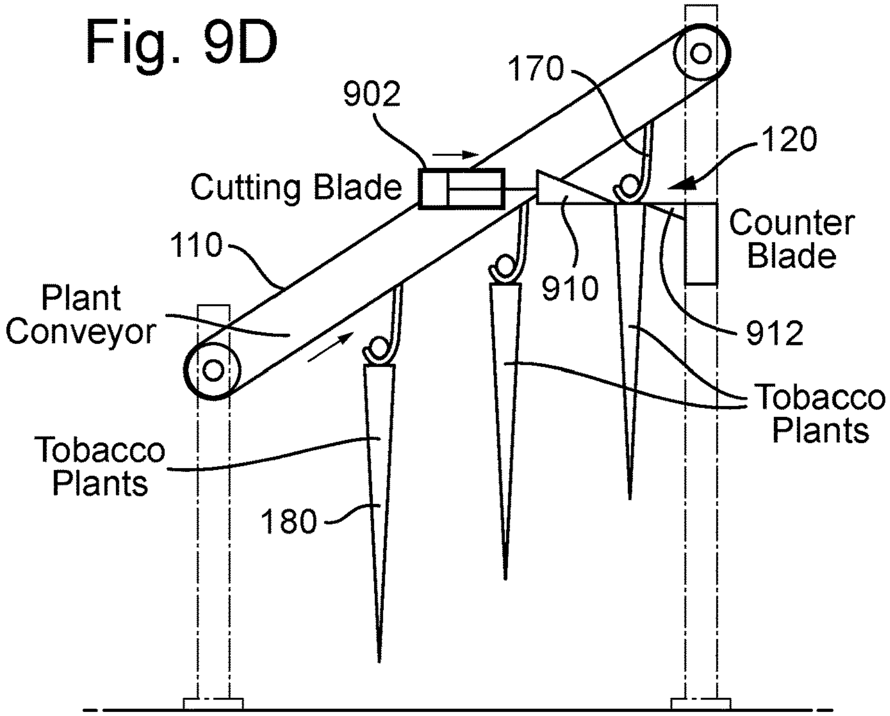

FIG. 9D shows a conveyor belt 110 and defoliator mechanism 120 of another apparatus for defoliating plants (other portions of the apparatus, such as a support structure and any leaf sorting system, are omitted for clarity). The leaves 180 hang down from hooks 170 which in turn are suspended from conveyor belt 110 to move the leaves to the defoliator 120. Compared with implementations described above, the defoliation mechanism 120 of FIG. 9D acts to cut the leaves 180 from the stalk, rather than in effect pulling them from the stalk as per FIGS. 9A and 9B (or pulling the stalk from the leaves as per FIG. 9C). In particular, the defoliator mechanism of FIG. 9D comprises a fixed counter blade 912 and a cutting blade 910 which is driven by actuator 902 between an engaged (cutting) position and a disengaged position. Accordingly, counter blade 912 and cutting blade 910 can be regarded as two opposing surfaces (edges). The blades can be implemented in any suitable manner, for example as a spinning blade (akin to a circular saw) or as a standard knife blade. In some implementations both opposing surfaces (blades) may move to transition between the engaged and disengaged positions—e.g. the counter blade 912 may have its own actuator. In some implementations, the counter blade may be replaced by a flat (vertical) surface, akin to one of the opposing surfaces in the implementation of FIG. 9C. One advantage of the apparatus of FIG. 9D is that the defoliator mechanism is again relatively simple (like for FIG. 9C), in that the two opposing surfaces (blades) only have to be moved together and apart between the engaged and disengaged positions, but without any additional motion (such as rotation).

Figure 9E:
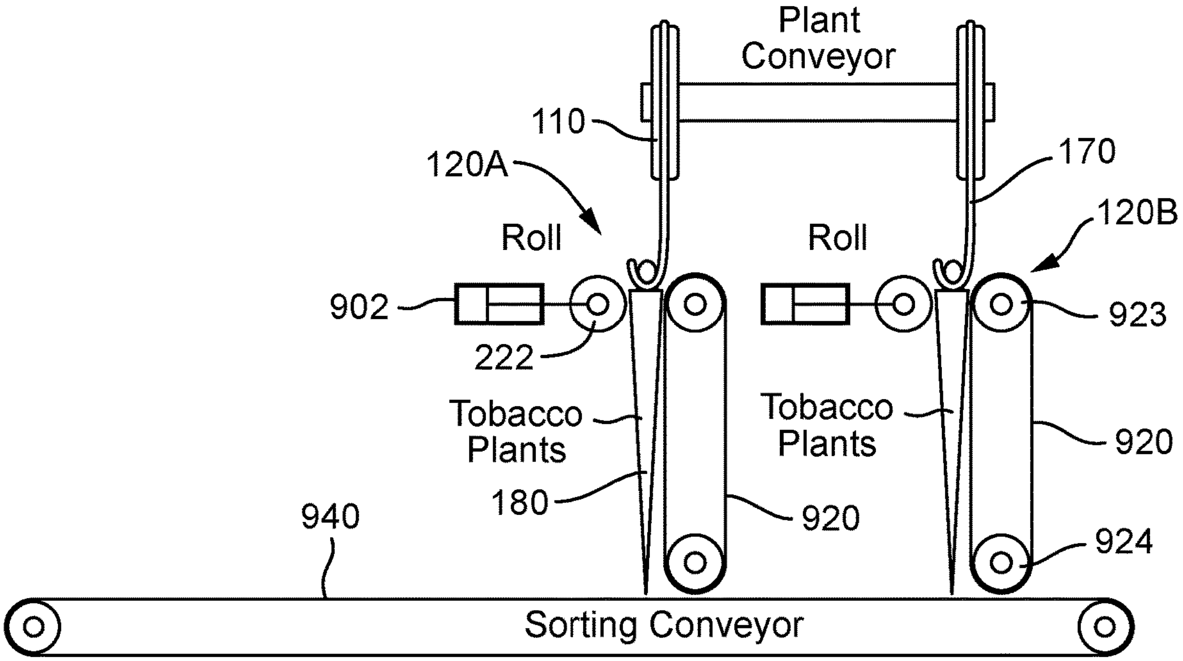

FIG. 9E shows a conveyor belt 110 and defoliator mechanism 120 of another apparatus for defoliating plants (other portions of the apparatus, such as a support structure, are omitted for clarity). The leaves 180 hang down from hooks 170 which in turn are suspended from conveyor belt 110 to move the leaves to the defoliation mechanism. The implementation of FIG. 9E has a number of differences compared with implementations described above. Firstly, the defoliation mechanism comprises two defoliators 120A, 120B. This is somewhat analogous to the implementation of FIG. 9A above, in that it allows two plants to be defoliated at the same time (or more, if additional defoliators are provided), thereby increasing the processing rate of the apparatus. However, rather than having the two stalks for parallel processing being end to end in a lateral (transverse) configuration, in FIG. 9E the two stalks are in effect side to side. Unlike for FIG. 9A, it will be appreciated that this configuration of FIG. 9E does not require any increased width, but will tend to increase slightly the length of the apparatus.

A further difference of the implementation of FIG. 9E concerns the structure of the defoliators 120A, 120B. These two defoliators (which are the same as one another) each comprise a roller 222 linked to an actuator 902 for moving the roller between the engaged and disengaged position. Each defoliator further includes a belt 920 suspended between an upper roller 923 and a lower roller 924. The roller 22 and the belt 920 provide opposing surfaces for gripping and separating the leaves when in the engaged position. In operation, the roller 922 and/or the belt 920 may be rotated to separate the leaves from the stalk. The belt may be rotated by rotating roller 923 and/or roller 924. The use of a roller 222 and belt 920 may have various benefits. For example, the belt may stop stray leaves (or portions thereof) from one defoliator somehow interacting with the other defoliator after separation. The belt 920 may also be more tolerant of any variation in the positioning of the roller, for example, due to movement of the roller 22 (e.g. up or down) during the defoliation processing.

A further difference is that the implementation of FIG. 9E has one or more conveyors 940 to collect the leaves 180 after defoliation. Note that since the orientation of the stalks for FIG. 9E is perpendicular to the page, while the motion of the conveyor 940 is across the page (e.g. left to right), the different leaf categories will fall at different positions laterally (transversely) across the conveyor. This separation will then be maintained during motion of the conveyor, which may then discharge the defoliated leaves into some form of leaf sorting system, analogous to that described above based on the chutes or plates.

Figure 9F:
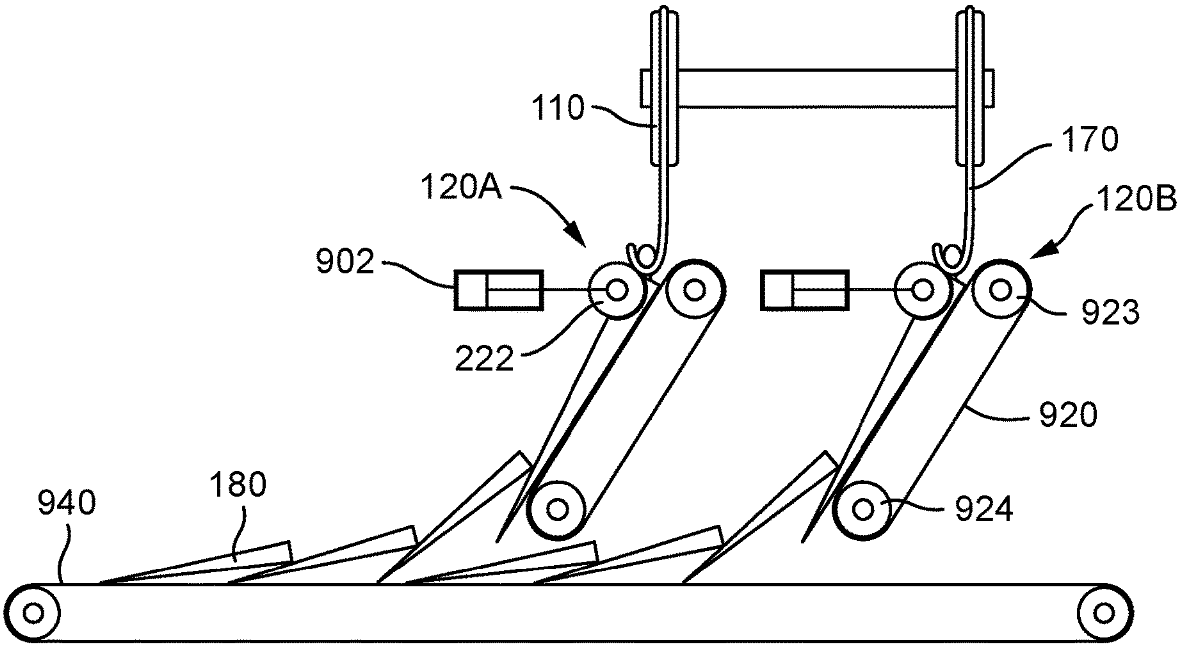

FIG. 9F is generally very similar to FIG. 9E with all the same components and the same general mode of operation. Accordingly, only the difference of FIG. 9F compared to FIG. 9E will be described, which is that the belts 920 are inclined away from the vertical in a direction that coincides with the movement of conveyor belt 940. In FIG. 9F, the conveyor belt is assumed to transport the defoliated leaves 180 from right to left of the page, and hence the lower roller 924 is positioned to the right of the upper roller 923 to give the belt 920 the appropriate inclination. Slanting the belt 920 at this manner generally provides an easier transition for the leaves from the defoliator 120 onto the conveyor belt 940, since the slant of the belt 920 already imparts a horizontal component of motion to the leaves in the same direction as movement of the conveyor belt 940. It must be emphasised that although the above example implementations show various combinations of feature, it is expressly envisaged that the disclosed features from different example implementations can be combined together in any appropriate combination (unless there would be a clear incompatibility in such combination). The following are presented as examples of such combinations (but are not in any way exhaustive):

- the double-width configuration of FIG. 9A could be used with the defoliator mechanism of FIG. 9C or 9D and or the conveyor belt 940 of FIGS. 9E and 9F
- the upward conveyor 110 of FIG. 9C may be used with a defoliator mechanism such as shown in FIG. 9A (whether of single or double width) to provide increased (but the full) separation force
- any of the implementations of FIGS. 9A-9F may be provided with a suitable leaf sorting system, such as based, for example, on guides (e.g. chutes or plates) as described above
- the longitudinal configuration of FIG. 9B may be used with a cutting defoliator such as shown in FIG. 9D
- in any implementation the two opposing surfaces may both be actuated (such as in FIG. 9C) or only one of the opposing surfaces may be actuated (such as in FIG. 9D)
- in the implementation of FIG. 9E or 9F, any of the three specified features may be used by itself, in conjunction with an implementation such as shown in FIG. 9A (of single or double width), or any pair of the three features may be likewise used. For example, an implementation may have the conveyor 940 of FIG. 9E or 9F, but just a single defoliator (which may comprise either a belt and roller or two rollers). Conversely, one or two defoliators comprising a belt and roller may be used without having the conveyor 940.

As noted above, the above example combinations are illustrative only, and the skilled person will form many other potential combinations of features based on the teachings described herein.

Figure 10:
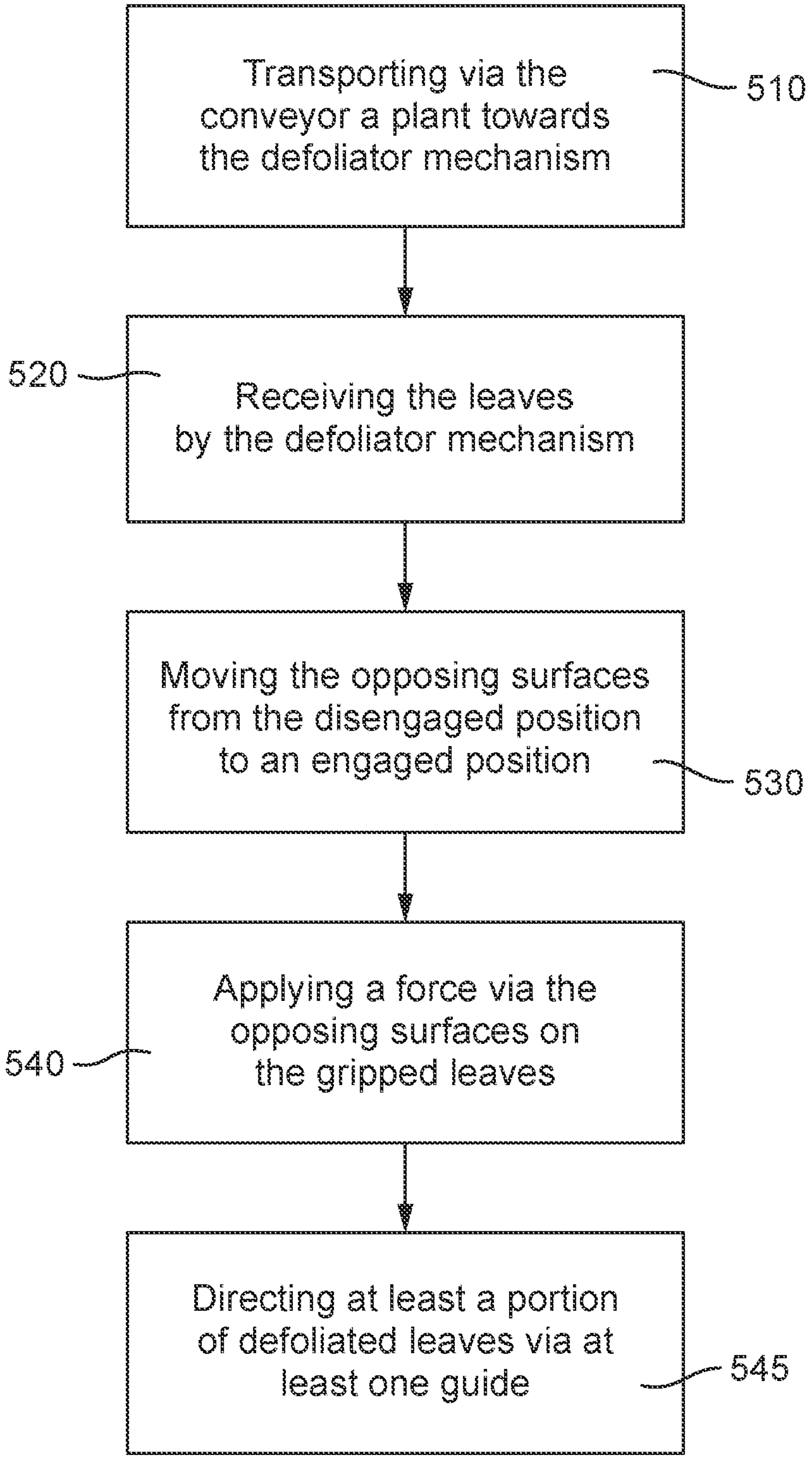
FIGS. 10 and 11 are schematic flow diagrams of two example methods for processing plant material to remove leaves according to the approach described herein.

FIG. 10 is a schematic flow diagram of an example method for processing plant material to remove leaves according to the approach described herein. The method commences at operation 510 with a tobacco plant being loaded onto the conveyor (e.g. onto the hooks) and transported towards the defoliator mechanism. Each plant may be loaded onto the conveyor by an operator (user or worker) or by a mechanical loading mechanism (not shown), which may be automated or manually controlled.

The plants are transported towards the defoliator mechanism with their stalks in an approximately horizontal orientation (e.g. within 25, 20, 15, 10, 5, 2 or 1 degrees of the horizontal) and with the leaves hanging down under gravity. The stalks are typically also aligned perpendicular to the direction of travel, which is convenient for processing each stalk in turn as the conveyor progresses. However, it is not excluded that the plant may be aligned parallel to the direction of conveyance, or in some other orientation (with corresponding changes to the alignment of the defoliator 120).

At step 520, the leaves are received by the defoliator mechanism. The leaves may be received by the defoliator mechanism when the opposing surfaces are in the disengaged position, with the leaves then being gripped as the opposing surfaces move from the disengaged position to the engaged position. The operation of the defoliator 120 relative to the positioning of the leaves may be controlled automatically, for example, by using one or more sensors (optical and/or motion) associated within the conveyor 110 and/or the defoliator 120. In other implementations, the plants may be positioned relative to the defoliator mechanism by an operator using a control panel for operating the conveyor and/or the defoliator mechanism.

At step 530, the opposing surfaces of the defoliator 120 are moved from their disengaged position to their engaged position to grip leaves that are located between these surfaces. This operation may involve moving one of the opposing surfaces, with the other kept stationary, or both of the opposing surfaces may be moved. As discussed above, the disengaged position allows leaves hanging from the conveyor 110 to be received into the defoliator, e.g. because one of the opposing surfaces (such as the second roller 222 in FIG. 5) is moved out of the path of the leaves in the disengaged position, such as by lowering this opposing surface. In other implementations, the apparatus may have a different geometry relative to the movement of the leaves, leading to a different motion between the engaged and disengaged positions. For example, in some cases the opposing surfaces may be translated with respect to each other between the engaged and disengaged positions, such that the alignment of the opposing surfaces remains unchanged, while in other cases the opposing surfaces may be re-orientated as part of the movement, such as by rotation along an arc.

At step 540, a force is applied to the gripped leaves via the opposing surfaces to separate the leaves from the stalk. The force causes the gripped leaves to move in a downward direction away from the stalk, which is retained in position by the conveyor (e.g. by the rows of hooks). In many implementations, the direction of movement may be substantially downward, but some horizontal component may also be present, for example, to help direct the leaves into chutes 140 or plates 142 (depending upon the particular geometry of the apparatus). In general, the direction of separation of the leaves from the stalk is within 25, 20, 15, 10, 5, 2 or 1 degrees of the vertical.

As discussed in relation to FIGS. 6A, 6B and 6C above, the separation force may be applied by various forms of defoliator mechanism, such as rotating rollers or similar (FIG. 6A), rotating belts (FIG. 6B), or by translating opposing plates or jaws (FIG. 6C). The applied force is great enough to overcome the connection of the leaves to the stalk, and so acts to defoliate the stalk. The leaves defoliated from the plant stalk typically drop or fall from the defoliator mechanism.

At step 545 at least a portion of defoliated leaves is directed via at least one guide (such as a chute 140 or plate 142). The at least one guide may be provided to direct leaves into particular containers or areas—e.g. there may be multiple guides, each guide directing leaves of a particular type or category into a respective container. In some implementations, an operator may be able to alter the sorting of the guides, as appropriate for the current tobacco plants being processed, for example, based on the grade or size of plant, variety of crop, source of crop, etc. In some cases, the guides and/or containers may be adjustable, or replaceable by other configurations.

As the containers fill up, the defoliation of the tobacco plants may be temporarily interrupted to allow one or more containers to be emptied (or replaced). In some implementations, an operator and/or one or more sensors (e.g. optical sensors or pressure sensors) may be used to assess when a container is (nearly) full and hence in need of replacement or emptying, after which the processing of the tobacco plants 10 can restart. Subsequently, the defoliated leaves may be subject to further processing as appropriate—e.g. curing (if not already performed), and/or baling (either loosely or in bundles, as desired). In some cases, in which apparatus 100 is not used to sort different leaf types into different containers, the further processing may also include a separate (subsequent) step of sorting the leaves into different classes, this may be performed manually or automatically. On the other hand, in some cases the intended use of the leaves may not require segregation by leaf class, or alternatively, the plants being processed may rather homogeneous leaves, and so do not require sorting.

Figure 11:
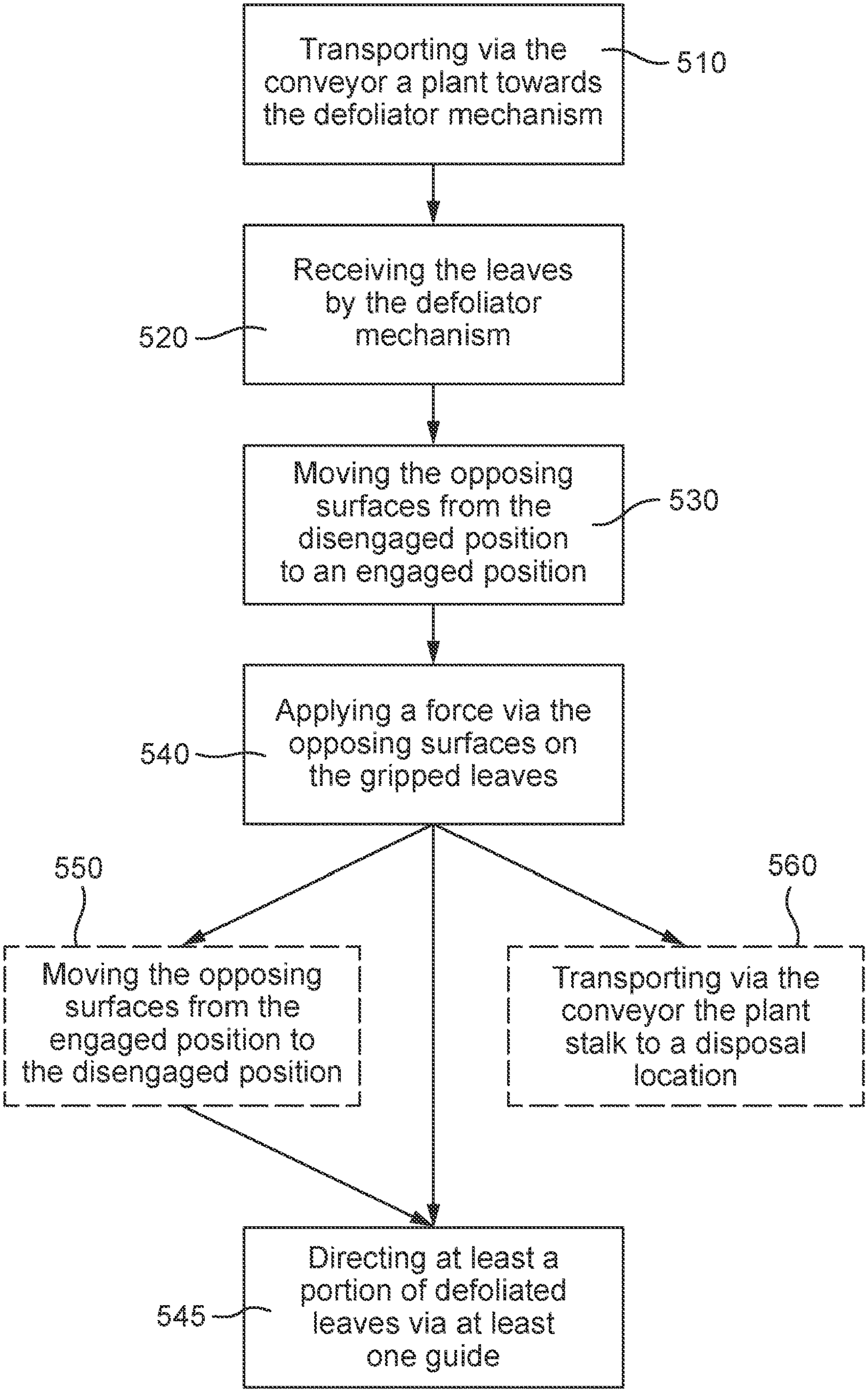

FIG. 11 is a schematic flow diagram of a further example method for processing plant material to remove leaves according to the approach described herein. Steps 510-540 of the method are unchanged with respect to FIG. 10 and are not described again.

The method depicted in FIG. 11 includes two further optional steps 550, 560 which may be performed simultaneously, as shown, or sequentially (in either order). After the force has been applied to the gripped leaves to separate them from the stalk in step 540, the stalk and leaves are independent of each other. In step 550, the opposing surfaces of the defoliator are now moved from the engaged position to the disengaged position to ensure that any leaves which remain gripped by the opposing surfaces are released and allowed to fall or drop (into chutes and/or containers for example). This is particularly relevant in the case of an implementation such as FIG. 6C, in which the operation of the defoliator is to remove leaves from the stalk, but where the leaves then remain gripped until the opposing surfaces are disengaged.

In some examples, such as those in accordance with the example of FIG. 6C, step 545 is performed, at least in part, after step 550. In other words, at least a portion of the leaves are directed via at least one guide (e.g. chute 140) after the opposing surfaces have been moved from the engaged position to the disengaged position. This is to be contrasted with an implementation such as shown in FIG. 6A or 6B, in which the continuous motion (rotation) of the opposing surfaces provides a feed-through action to automatically release the leaves after defoliation. In these examples, step 545 typically occurs prior to step 550, although it will be appreciated that any leaves remaining between the opposing surfaces when the opposing surfaces are moved from engaged position to the disengaged position will be released by the opposing surfaces and may be directed by the at least one guide into a suitable container. As such, step 545 may occur before, or during, or after step 550.

Note also that disengaging the defoliator mechanism may also be important to ready the machine to receive the next plant for processing, i.e. to provide a path for the next leaves to be received into the defoliator, as discussed above in relation to FIG. 5.

In step 560 the defoliated plant stalk is transported via the conveyor to a disposal mechanism which is configured to receive the defoliated stalks from the conveyor and transport them to a disposal location. As an example, the conveyor may be configured to release the defoliated stalks when they reach a particular location of the conveyor mechanism. For example, as shown in FIG. 3, the stalks fall automatically from the hooks when the hooks are rotated to travel in the opposite direction (i.e. when the hooks reach the end of the conveyor belt). The released stalks fall onto the disposal mechanism (a slide or ramp in FIG. 3) and are transported to the disposal location (such as a bin, shredder, or suchlike). In other examples, the disposal mechanism may include a specific mechanism to actively retrieve the stalks from the conveyor (i.e. by picking or pushing them off the conveyor).

In conclusion, the present application provides methods and apparatus for processing plant material to remove leaves from a plant stalk. According to one aspect, there is provided an apparatus comprising a conveyor for transporting a plant with leaves hanging down from the stalk; and a defoliator mechanism having two opposing surfaces, the opposing surfaces being movable between (i) a disengaged position for receiving leaves hanging down from the conveyor, and (ii) an engaged position in which the opposing surfaces are configured to grip leaves received by the defoliator mechanism; wherein the opposing surfaces act in the engaged position to apply a force on the gripped leaves to separate them from the stalk. The apparatus further comprises a leaf sorting system configured to separate the defoliated leaves into different categories corresponding to position on the stalk.

The leaf sorting system may include multiple guides, each guide being configured to receive and direct a respective category of leaves such that each category of leaves is received and directed by a different guide. Typically, the defoliated leaves fall under the action of gravity down from the defoliator mechanism to the guides and onwards past the guides. The leaf sorting system may further comprise multiple containers for receiving defoliated leaves from the guides, each container being configured to receive a respective category of leaves such that each category of leaves is received by a different container. The guides may be implemented, for example, as plates or chutes.

In some cases, the guides may have an adjustable position to accommodate different sizes of plant. For example, smaller plants will tend to have leaves from different categories closer together, hence the guides may be adjusted closer together, and conversely, larger plants will tend to have leaves from different categories spaced further apart along the stalk, hence the guides may be adjusted so as to be further apart. This adjustment may be performed manually, or automatically, for example, by using a sensing system to detect the size of a plant to be defoliated, and then adjusting the plate positions accordingly.

The use of guides, e.g. chutes or plates, in this manner allows automated sorting of defoliated leaves into different categories by helping to separate the leaves after removal, for example, to direct the leaves into different containers corresponding to respective leaf categories.

According to another aspect, an apparatus is provided for processing plant material to remove leaves from a plant stalk. The apparatus comprises a conveyor for transporting a plant with leaves hanging down from the stalk; and a defoliator mechanism having two rollers, the rollers being movable between (i) a disengaged position for receiving leaves hanging down from the conveyor, and (ii) an engaged position in which the rollers are configured to grip the leaves received by the defoliator mechanism. When the two rollers are in the engaged position, the defoliator mechanism is configured to rotate the two rollers to apply a force to separate the leaves from the stalk.

By driving the rotation of two rollers, a greater separation force can be applied that when driving just a single roller (and having the other roller a free roller, for example). To support synchronisation of the two drive rollers, e.g. to help avoid a shear force on the leaves, the two rollers are generally drive in synchronism but in an opposite rotational direction from one another, for example by connecting both of the two rollers to the same drive motor.

Note that in other implementations, the defoliator mechanism may be configured to drive only a single roller, e.g. with the other roller being allowed to rotate freely, but not driven. Although such implementations will typically provide a lower force for defoliation that a situation in which both rollers are driven, this does simplify the drive mechanism and so can help to reduce cost.

According to a further aspect, there is provided an apparatus provided for processing plant material to remove leaves from a plant stalk, the apparatus comprising: a conveyor for transporting a plant with leaves hanging down from the stalk; and a defoliator mechanism having two opposing surfaces, the opposing surfaces being movable between (i) a disengaged position for receiving leaves hanging down from the conveyor, and (ii) an engaged position in which the opposing surfaces are configured to grip the leaves received by the defoliator mechanism, wherein one or both of the opposing surfaces is textured; and wherein the opposing surfaces act in the engaged position to apply a force on the gripped leaves to separate them from the stalk.

According to a further aspect, there is provided an apparatus provided for processing plant material to remove leaves from a plant stalk, the apparatus comprising: a conveyor for transporting a plant with leaves hanging down from the stalk; a defoliator mechanism having two opposing surfaces, the opposing surfaces being movable between (i) a disengaged position for receiving leaves hanging down from the conveyor, and (ii) an engaged position in which the opposing surfaces are configured to grip the leaves received by the defoliator mechanism, wherein the opposing surfaces act in the engaged position to apply a force on the gripped leaves to separate them from the stalk; and one or more sensors for triggering at least one control task for controlling the defoliation of the leaves.

According to a further aspect, there is provided an apparatus provided for processing plant material to remove leaves from a plant stalk, the apparatus comprising: a conveyor for transporting a plant with leaves hanging down from the stalk; and a defoliator mechanism having two opposing surfaces, the opposing surfaces being movable between (i) a disengaged position for receiving leaves hanging down from the conveyor, and (ii) an engaged position in which the opposing surfaces are configured to grip the leaves received by the defoliator mechanism; wherein the opposing surfaces act in the engaged position to apply a force on the gripped leaves to separate them from the stalk; and wherein the conveyor is inclined upwards as the leaves approach the defoliator. The upwards inclination of the conveyor therefore tends to lift the stalk up and away from the leaves, which at the same time are being pulled downwards by the defoliator, and thereby helps to increase the overall separation force between the leaves and the stalk.

According to a further aspect, there is provided an apparatus for processing plant material to remove leaves from a plant stalk, the apparatus comprising: a conveyor for transporting a plant with leaves hanging down from the stalk; a defoliator mechanism comprising at least one blade for cutting the leaves from the stalk; and a leaf sorting system configured to separate the defoliated leaves into different categories corresponding to position on the stalk. Using a blade with a cutting action to separate the leaves from the stalk may be less liable to damage defoliated leaves compared with applying a downward force in effect to pull the leaves from the stalk.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include one or more other inventions not presently claimed, but which may be claimed in future.

The invention claimed is:

1. Apparatus for processing plant material to remove leaves from a plant stalk, the apparatus comprising:

a conveyor for transporting a plant with leaves hanging down from the stalk;

a defoliator mechanism having two opposing surfaces, the opposing surfaces being movable between (i) a disengaged position for receiving leaves hanging down from the conveyor, and (ii) an engaged position in which the opposing surfaces are configured to grip the leaves received by the defoliator mechanism; wherein the opposing surfaces act in the engaged position to apply a force on the gripped leaves to separate them from the stalk; and a leaf sorting system configured to separate the defoliated leaves into different categories corresponding to position on the stalk;

wherein the leaf sorting system includes multiple guides, each guide being configured to receive and direct a respective category of leaves such that each category of leaves is received and directed by a different guide;

wherein the guides are configured such that the relative position of the guides can be adjusted along an axis which is parallel to the orientation of a plant stalk being transported by a conveyor; and wherein the guides are configured such that they can be adjusted to be closer together along said axis for sorting smaller plants and further apart from one another along said axis for sorting larger plants.

2. The apparatus of claim 1, wherein the defoliated leaves fall under the action of gravity down from the defoliator mechanism to the guides and onwards past the guides.

3. The apparatus of claim 1, wherein the leaf sorting system further comprises multiple containers for receiving defoliated leaves from the guides, each container being configured to receive a respective category of leaves such that each category of leaves is received by a different container.

4. The apparatus of claim 1, wherein there are N categories of defoliated leaves, N guides, and N containers, each guide being configured to receive and direct a respective category of defoliated leaves from a corresponding position on the stalk to a respective container.

5. The apparatus of claim 1, wherein the guides comprise plates, or wherein the guides comprise chutes.

6. The apparatus of claim 1, wherein the defoliator mechanism further comprises a roller which provides a first one of the two opposing surfaces, and wherein the defoliator mechanism is configured to rotate the roller to apply the force to separate the leaves from the stalk.

7. The apparatus of claim 6, wherein the defoliator mechanism further comprises a second roller which provides a second one of the two opposing surfaces.

8. The apparatus of claim 7, wherein the defoliator mechanism is configured to rotate the second roller such that the first and second ones of the two opposing surfaces both move together in the same direction.

9. The apparatus of claim 7, wherein the second roller is enabled to move sufficiently away from the first roller in the engaged position to accommodate the received leaves.

10. The apparatus of claim 1, wherein one or both of the two opposing surfaces is textured.

11. A method for processing plant material to remove leaves from a plant stalk using an apparatus according to claim 1, the method comprising:

transporting a plant via the conveyor to the defoliator mechanism;

receiving the leaves hanging down from the conveyor by the defoliator mechanism with the opposing surfaces in a disengaged position;

moving the opposing surfaces from the disengaged position to an engaged position in which the opposing surfaces are configured to grip the leaves received by the defoliator mechanism; and applying a force via the opposing surfaces on the gripped leaves to separate them from the stalk.

12. Apparatus for processing plant material to remove leaves from a plant stalk, the apparatus comprising:

a conveyor for transporting a plant with leaves hanging down from the stalk;

a defoliator mechanism having two opposing surfaces, the opposing surfaces being movable between (i) a disengaged position for receiving leaves hanging down from the conveyor, and (ii) an engaged position in which the opposing surfaces are configured to grip the leaves received by the defoliator mechanism: wherein the opposing surfaces act in the engaged position to apply a force on the gripped leaves to separate them from the stalk; and a leaf sorting system configured to separate the defoliated leaves into different categories corresponding to position on the stalk;

wherein the leaf sorting system includes multiple guides, each guide being configured to receive and direct a respective category of leaves such that each category of leaves is received and directed by a different guide;

wherein the relative position of the guides can be adjusted along an axis which is parallel to the orientation of a plant stalk being transported by a conveyor; and wherein the apparatus further comprises one or more sensors for detecting the size of a plant to be defoliated, wherein the apparatus is configured to adjust the relative position of the guides along said axis in response to the detected size of the plant.

13. Apparatus for processing plant material to remove leaves from a plant stalk, the apparatus comprising:

a conveyor for transporting a plant with leaves hanging down from the stalk; and a defoliator mechanism having two cylindrical rollers, the rollers being movable between (i) a disengaged position for receiving leaves hanging down from the conveyor, and (ii) an engaged position in which the rollers are configured to grip the leaves received by the defoliator mechanism;

wherein the rollers are configured such that, in the disengaged position, the separation between the axes of the rollers is greater than the separation between the axes when the rollers are in the engaged position;

wherein when the two rollers are in the engaged position, the defoliator mechanism is configured to rotate the two rollers to apply a force to separate the leaves from the stalk.

14. The apparatus of claim 13, wherein one of the two rollers is fixed, and the other of the two rollers is movable to transition the defoliator mechanism between the engaged position and the disengaged position.

15. The apparatus of claim 13, wherein the two rollers are driven in synchronism but in an opposite rotational direction from one another.

16. The apparatus of claim 15, wherein both of the two rollers are connected to the same drive motor.

17. A method for processing plant material to remove leaves from a plant stalk using an apparatus according to claim 13, the method comprising:

transporting a plant via the conveyor to the defoliator mechanism;

receiving the leaves hanging down from the conveyor by the defoliator mechanism with the opposing surfaces in a disengaged position;

moving the opposing surfaces from the disengaged position to an engaged position in which the opposing surfaces are configured to grip the leaves received by the defoliator mechanism; and applying a force via the opposing surfaces on the gripped leaves to separate them from the stalk.

* * * * *